(12) United States Patent
Eyuboglu

(10) Patent No.: US 10,785,791 B1
(45) Date of Patent: Sep. 22, 2020

(54) CONTROLLING DATA TRANSMISSION IN RADIO ACCESS NETWORKS

(71) Applicant: COMMSCOPE TECHNOLOGIES LLC, Hickory, NC (US)

(72) Inventor: Vedat Eyuboglu, Weston, MA (US)

(73) Assignee: CommScope Technologies LLC, Hickory, NC (US)

(*) Notice: Subject to any disclaimer, the term of this patent is extended or adjusted under 35 U.S.C. 154(b) by 99 days.

(21) Appl. No.: 14/961,448

(22) Filed: Dec. 7, 2015

(51) Int. Cl.
*H04W 72/12* (2009.01)
*H04L 1/18* (2006.01)

(52) U.S. Cl.
CPC ....... *H04W 72/1289* (2013.01); *H04L 1/1812* (2013.01)

(58) Field of Classification Search
CPC .......... H04L 1/1812; H04W 72/1289
See application file for complete search history.

(56) References Cited

U.S. PATENT DOCUMENTS

| | | | |
|---|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,985,451 B1 | 1/2006 | Nattiv et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |

(Continued)

FOREIGN PATENT DOCUMENTS

| | | |
|---|---|---|
| CN | 101044773 A | 9/2007 |
| CN | 101622811 A | 1/2010 |

(Continued)

OTHER PUBLICATIONS

United States Patent and Trademark Office, "Office Action", "From U.S. Appl. No. 15/230,936", dated Jun. 15, 2017, pp. 1-60, Published in: US.

(Continued)

*Primary Examiner* — Jenee Holland
(74) *Attorney, Agent, or Firm* — Fogg & Powers LLC

(57) ABSTRACT

An example communication system includes remote units, each which includes one or more radio frequency (RF) units to exchange RF signals with mobile devices, with at least some of the RF signals including information destined for, or originating from, a mobile device. A controller is separated from the remote units by one or more networks. The controller is connected to an external network, and is for implementing a scheduler. The scheduler is for allocating resources for transmission of data representing the information, and is configured to override a pending hybrid automatic repeat request (HARQ) transmission on a HARQ process by scheduling a new HARQ transmission on the HARQ process.

6 Claims, 11 Drawing Sheets

(56) References Cited

U.S. PATENT DOCUMENTS

| | | |
|---|---|---|
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,798,680 B2 | 8/2014 | Kiiski et al. |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,958,809 B2 | 2/2015 | Nama et al. |
| 8,976,794 B2 | 3/2015 | Xiong |
| 8,982,841 B2 | 3/2015 | Srinivasan |
| 9,072,120 B2 | 6/2015 | Voschina et al. |
| 9,078,284 B2 | 7/2015 | Richardson |
| 9,130,711 B2 | 9/2015 | He et al. |
| 9,179,360 B1 | 11/2015 | Vivanco |
| 9,380,466 B2 | 6/2016 | Eyuboglu et al. |
| 9,414,399 B2 | 8/2016 | Eyuboglu et al. |
| 9,497,131 B2 | 11/2016 | Koskinen et al. |
| 9,602,182 B2 | 3/2017 | Zhang et al. |
| 9,877,340 B1 | 1/2018 | Park et al. |
| 9,936,470 B2 | 4/2018 | Eyuboglu et al. |
| 10,057,916 B2 | 8/2018 | Barabell et al. |
| 10,064,072 B2 | 8/2018 | Eyuboglu et al. |
| 10,142,962 B2 | 11/2018 | Lee et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2003/0147348 A1* | 8/2003 | Jiang ............... H04L 1/1841 370/229 |
| 2004/0068571 A1 | 4/2004 | Ahmavaara |
| 2004/0146072 A1 | 6/2004 | Farmwald |
| 2004/0136373 A1 | 7/2004 | Bareis |
| 2004/0143442 A1 | 7/2004 | Knight |
| 2004/0224637 A1 | 11/2004 | Silva et al. |
| 2005/0025160 A1 | 2/2005 | Meier et al. |
| 2005/0043030 A1 | 2/2005 | Shariat et al. |
| 2005/0073964 A1 | 4/2005 | Schmidt et al. |
| 2005/0073987 A1* | 4/2005 | Wu ............... H04L 1/0007 370/349 |
| 2005/0157675 A1 | 7/2005 | Feder et al. |
| 2005/0180460 A1 | 8/2005 | Hirano et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0071006 A1 | 3/2007 | Bosch et al. |
| 2007/0086487 A1 | 4/2007 | Yasuda et al. |
| 2007/0140218 A1 | 6/2007 | Nair et al. |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0022180 A1* | 1/2008 | Kuo ............... H04L 1/188 714/748 |
| 2008/0200202 A1 | 8/2008 | Monotojo et al. |
| 2008/0233886 A1* | 9/2008 | Kaminski ............. H04L 1/1607 455/70 |
| 2008/0240034 A1* | 10/2008 | Gollamudi ........... H04W 72/04 370/330 |
| 2009/0009744 A1 | 4/2009 | Lohr et al. |
| 2009/0097444 A1 | 4/2009 | Lohr et al. |
| 2009/0135718 A1* | 5/2009 | Yeo ............... H04L 1/1874 370/225 |
| 2009/0149189 A1 | 6/2009 | Sammour et al. |
| 2009/0149221 A1 | 6/2009 | Liu et al. |
| 2009/0180423 A1 | 7/2009 | Kroener |
| 2009/0180435 A1 | 7/2009 | Sarkar |
| 2009/0265599 A1* | 10/2009 | Chae ............... H04L 1/1812 714/749 |
| 2009/0276542 A1 | 11/2009 | Aweya et al. |
| 2009/0287976 A1* | 11/2009 | Wang ............... H04L 1/1812 714/748 |

(56) References Cited

U.S. PATENT DOCUMENTS

| | | | |
|---|---|---|---|
| 2009/0300453 A1* | 12/2009 | Sahara | H04L 1/0003 714/748 |
| 2009/0307554 A1 | 12/2009 | Marinier et al. | |
| 2009/0310534 A1 | 12/2009 | Lindskog et al. | |
| 2009/0316626 A1* | 12/2009 | Lee | H04L 1/1607 370/328 |
| 2009/0327829 A1* | 12/2009 | Yang | H04L 1/1829 714/749 |
| 2010/0011269 A1* | 1/2010 | Budianu | H04L 1/1812 714/748 |
| 2010/0011271 A1* | 1/2010 | Giancola | H04L 1/1845 714/748 |
| 2010/0034135 A1 | 2/2010 | Kim et al. | |
| 2010/0037115 A1* | 2/2010 | Zheng | H04L 1/1835 714/749 |
| 2010/0062768 A1 | 3/2010 | Lindqvist et al. | |
| 2010/0098010 A1* | 4/2010 | Kuo | H04L 1/1887 370/329 |
| 2010/0115367 A1* | 5/2010 | Hsu | H04L 1/189 714/748 |
| 2010/0118777 A1* | 5/2010 | Yamada | H04W 74/008 370/328 |
| 2010/0118781 A1 | 5/2010 | Petrovic et al. | |
| 2010/0142494 A1* | 6/2010 | Hsu | H04L 1/189 370/336 |
| 2010/0167718 A1 | 7/2010 | Chiussi et al. | |
| 2010/0169732 A1* | 7/2010 | Wu | H04L 1/189 714/748 |
| 2010/0185911 A1* | 7/2010 | Cheng | H04L 1/1829 714/751 |
| 2010/0234035 A1 | 9/2010 | Fujishima et al. | |
| 2010/0246513 A1* | 9/2010 | Lindskog | H04L 1/1825 370/329 |
| 2010/0257419 A1 | 10/2010 | Sung et al. | |
| 2011/0134862 A1 | 6/2011 | Huang et al. | |
| 2011/0145672 A1* | 6/2011 | Jongren | H04L 1/1854 714/748 |
| 2011/0170517 A1 | 7/2011 | Bakker et al. | |
| 2011/0182255 A1 | 7/2011 | Kim et al. | |
| 2011/0194548 A1 | 8/2011 | Feder et al. | |
| 2011/0194630 A1 | 8/2011 | Yang et al. | |
| 2011/0211447 A1* | 9/2011 | Wang | H04W 72/1289 370/230 |
| 2011/0268007 A1 | 11/2011 | Barany et al. | |
| 2011/0287791 A1 | 11/2011 | Fujishima et al. | |
| 2011/0310802 A1* | 12/2011 | Song | H04L 1/1812 370/328 |
| 2012/0057572 A1 | 3/2012 | Evans et al. | |
| 2012/0127947 A1* | 5/2012 | Usui | H04W 4/02 370/329 |
| 2012/0140660 A1 | 6/2012 | Kang et al. | |
| 2012/0147815 A1* | 6/2012 | Meyer | H04B 7/022 370/328 |
| 2012/0176884 A1 | 7/2012 | Zhang et al. | |
| 2012/0176966 A1 | 7/2012 | Ling | |
| 2012/0176980 A1 | 7/2012 | Moon et al. | |
| 2012/0176996 A1 | 7/2012 | Kim et al. | |
| 2012/0177153 A1* | 7/2012 | Cheng | H04L 1/1845 375/341 |
| 2012/0183028 A1 | 7/2012 | Han et al. | |
| 2012/0189074 A1 | 7/2012 | Jin et al. | |
| 2012/0195284 A1* | 8/2012 | Mann | H04W 28/16 370/329 |
| 2012/0207105 A1 | 8/2012 | Geirhofer et al. | |
| 2012/0208581 A1 | 8/2012 | Ishida et al. | |
| 2012/0213109 A1 | 8/2012 | Xu et al. | |
| 2012/0250520 A1 | 10/2012 | Chen et al. | |
| 2012/0250740 A1 | 10/2012 | Ling | |
| 2012/0257570 A1* | 10/2012 | Jang | H04L 5/001 370/328 |
| 2012/0264470 A1 | 10/2012 | Bajj et al. | |
| 2012/0300635 A1* | 11/2012 | Jersenius | H04W 72/0486 370/235 |
| 2012/0300766 A1 | 11/2012 | Chen et al. | |
| 2012/0327882 A1* | 12/2012 | Park | H04B 7/0632 370/329 |
| 2013/0016686 A1* | 1/2013 | Li | H04L 1/1822 370/329 |
| 2013/0034197 A1 | 2/2013 | Aweya et al. | |
| 2013/0100948 A1 | 4/2013 | Irvine | |
| 2013/0136053 A1* | 5/2013 | Kim | H04L 1/1812 370/312 |
| 2013/0136104 A1 | 5/2013 | Samar et al. | |
| 2013/0194985 A1* | 8/2013 | Zetterman | H04W 52/0216 370/311 |
| 2013/0223307 A1* | 8/2013 | Ohlsson | H04W 52/0216 370/311 |
| 2013/0223365 A1 | 8/2013 | Choi et al. | |
| 2013/0223391 A1* | 8/2013 | Koo | H04W 72/0406 370/329 |
| 2013/0242837 A1* | 9/2013 | Yang | H04L 1/1812 370/311 |
| 2013/0242919 A1* | 9/2013 | Koo | H04W 72/1215 370/329 |
| 2013/0250869 A1* | 9/2013 | Eriksson | H04W 72/1231 370/329 |
| 2013/0279452 A1 | 10/2013 | Liu | |
| 2103/0294403 | 11/2013 | Srinivasan | |
| 2013/0322270 A1 | 12/2013 | Ko | |
| 2014/0003389 A1 | 1/2014 | Wang et al. | |
| 2014/0031036 A1* | 1/2014 | Koo | H04W 36/20 455/434 |
| 2014/0044057 A1 | 2/2014 | Gaal et al. | |
| 2014/0071868 A1* | 3/2014 | Bergquist | H04L 1/1864 370/311 |
| 2014/0086112 A1* | 3/2014 | Stern-Berkowitz | H04W 72/1289 370/280 |
| 2014/0098797 A1 | 4/2014 | Kanamarlapudi et al. | |
| 2014/0126438 A1 | 5/2014 | Zhu et al. | |
| 2014/0161070 A1 | 6/2014 | Chang et al. | |
| 2014/0162664 A1 | 6/2014 | Stapleton et al. | |
| 2014/0177549 A1 | 6/2014 | Knisely | |
| 2014/0211690 A1 | 7/2014 | Nama et al. | |
| 2014/0212269 A1 | 7/2014 | Kastner et al. | |
| 2014/0219162 A1 | 8/2014 | Eyuboglu et al. | |
| 2014/0219255 A1 | 8/2014 | Eyuboglu et al. | |
| 2014/0219267 A1 | 8/2014 | Eyuboglu et al. | |
| 2014/0321406 A1* | 10/2014 | Marinier | H04B 7/024 370/329 |
| 2015/0011219 A1 | 1/2015 | Saily et al. | |
| 2015/0023284 A1 | 1/2015 | Zhao et al. | |
| 2015/0085720 A1 | 3/2015 | Gaal et al. | |
| 2015/0085796 A1* | 3/2015 | Xu | H04L 1/16 370/329 |
| 2015/0172023 A1 | 6/2015 | Yang et al. | |
| 2015/0193282 A1* | 7/2015 | Blocksome | G06F 15/17306 719/313 |
| 2015/0256297 A1 | 9/2015 | Yang et al. | |
| 2015/0304960 A1 | 10/2015 | Yang et al. | |
| 2015/0373729 A1 | 12/2015 | Lee et al. | |
| 2016/0037550 A1 | 2/2016 | Barabell et al. | |
| 2016/0044548 A1 | 2/2016 | Choi et al. | |
| 2016/0302088 A1 | 10/2016 | Eyuboglu et al. | |
| 2016/0345342 A1 | 11/2016 | Eyuboglu et al. | |
| 2017/0135121 A1 | 5/2017 | Eyuboglu et al. | |
| 2017/0163330 A1 | 6/2017 | Raleigh et al. | |
| 2017/0317790 A1* | 11/2017 | Yao | H04L 1/1812 |
| 2018/0007709 A1* | 1/2018 | Seo | H04L 1/00 |
| 2019/0069190 A1 | 2/2019 | Eyuboglu et al. | |
| 2019/0075576 A1 | 3/2019 | Eyuboglu et al. | |

FOREIGN PATENT DOCUMENTS

| | | |
|---|---|---|
| CN | 102340823 | 2/2012 |
| CN | 102347827 A | 2/2012 |
| EP | 1134935 | 11/2008 |
| EP | 2352264 | 8/2011 |
| EP | 2787646 | 10/2014 |

(56) References Cited

FOREIGN PATENT DOCUMENTS

| WO | 2014124160 | | 8/2014 |
|---|---|---|---|
| WO | 2014153125 | A1 | 9/2014 |
| WO | 2015191530 | | 12/2015 |

OTHER PUBLICATIONS

United States Patent and Trademark Office, "Advisory Action", "From U.S. Appl. No. 14/734,311", dated Jun. 20, 2017, pp. 1-2, Published in: US.
U.S. Patent Office, "Notice of Allowance", "from U.S. Appl. No. 13/762,284", dated May 8, 2015, pp. 1-5, Published in: US.
U.S. Patent Office, "Notice of Allowance", "from U.S. Appl. No. 13/762,284", dated Aug. 26, 2015, pp. 1-12, Published in: US.
U.S. Patent Office, "Notice of Allowance", "from U.S. Appl. No. 13/762,284", dated Dec. 18, 2015, pp. 1-7, Published in: US.
U.S. Patent Office, "Notice of Allowance", "from U.S. Appl. No. 13/762,284", dated Feb. 25, 2016, pp. 1-6, Published in: US.
U.S. Patent Office, "Office Action", "from U.S. Appl. No. 13/762,284", dated Oct. 23, 2014, pp. 1-14, Published in: US.
European Patent Office, "Office Action from EP Application No. 14707024.7", "from Foreign Counterpart to U.S. Appl. No. 13/762,283", dated Oct. 5, 2016, pp. 1-6, Published in: EP.
European Patent Office, "European Search Report for EP Application No. 16175955.0", "Foreign Counterpart from U.S. Application No. 16175955.0", dated Oct. 10, 2016, pp. 1-10, Published in: EP.
European Patent Office, "European Search Report for EP Application No. 16175956.8", "Foreign counterpart to U.S. Appl. No. 13/762,283", dated Oct. 10, 2016, pp. 1-10, Published in: EP.
U.S. Patent Office, "Final Office Action", "from U.S. Appl. No. 13/762,283", dated Aug. 21, 2015, pp. 1-47, Published in: US.
U.S. Patent Office, "Notice of Allowance", "from U.S. Appl. No. 13/762,283", dated Apr. 1, 2016, pp. 1-9, Published in: US.
U.S. Patent Office, "Office Action", "from U.S. Appl. No. 13/762,283", dated Nov. 21, 2014, pp. 1-39, Published in: US.
U.S. Patent Office, "Office Action", "from U.S. Appl. No. 15/230,936", dated Jan. 12, 2017, pp. 1-10, Published in: US.
International Search Authority, "International Search Report and Written Opinion for PCT Application No. PCT/US2014/015137", "from Foreign Counterpart to U.S. Appl. No. 13/762,283", dated Sep. 22, 2014, pp. 1-18, Published in: WO.
U.S. Patent Office, "Advisory Action", "from U.S. Appl. No. 13/762,292", dated Feb. 6, 2017, pp. 1-4, Published in: US.
U.S. Patent Office, "Final Office Action", "from U.S. Appl. No. 13/762,292", dated Sep. 27, 2016, pp. 1-18, Published in: US.
U.S. Patent Office, "Office Action", "from U.S. Appl. No. 13/762,292", dated Dec. 30, 2015, pp. 1-25, Published in: US.
U.S. Patent Office, "Pre-Appeal Brief Conference Decision", "from U.S. Appl. No. 13/762,292", dated Apr. 12, 2017, pp. 1-6, Published in: US.
U.S. Patent Office, "Restriction Requirement", "from U.S. Appl. No. 13/762,292", dated May 27, 2015, pp. 1-6, Published in: US.
U.S. Patent Office, "Final Office Action", "from U.S. Appl. No. 14/734,311", dated Apr. 7, 2017, pp. 1-52, Published in: US.
U.S. Patent Office, "Office Action", "from U.S. Appl. No. 14/734,311", dated Jul. 14, 2016, pp. 1-64, Published in: US.
International Search Authority, "International Search Report and Written Opinion for PCT Application No. PCT/US2015/034829", "from Foreign Counterpart to U.S. Appl. No. 14/734,311", dated Dec. 8, 2015, pp. 1-14, Published in: WO.
International Search Authority, "International Search Report and Written Opinion for PCT Application No. PCT/US2016/064750", "from Foreign Counterpart U.S. Appl. No. 14/961,448", dated Mar. 8, 2017, pp. 1-14, Published in: US.
"3rd Generation Partnership Project; Technical Specification Group Radio Access Network; Evolved Universal Terrestrial Radio Access (E-UTRA); Base Station (BS) radio transmission and reception (Release 8)", "3GPP TS 36.104 V8.0.0", Dec. 2007, pp. 1-47.

"3rd Generation Partnership Project Techinical Specification Group Radio Access Network Evolved Universal Terrestrial Radio Access (E-UTRA) Requirement for Support of Radio Resource Management (Release 8), 3GPP TS 36.133 V8.1.0", Mar. 2008, p. 25 Publisher: 3GPP.
Belhouchet et al., "ITU/BDT Arab Regional Workshop on '4G Wireless Systems' LTE Technology: Session 3: LTE Overview-Design Targets and Multiple Access Technologies", "Tunisia", Jan. 27-29, 2010, pp. 1-82.
Dotsch et al., "Quantitative Analysis of Split Base Station Processing and Determination of Advantageous Architectures for LTE", "Published online: Wiley Online Library (wileyonlinelibrary.com)", 2013, pp. 105-128, Publisher: Bell Labs Technical Journal 18(1).
Garner, Geoffrey M., "IEEE 1588 Version 2", Sep. 24, 2008, p. 89.
Haberland, Bernd et al., "Base Stations in the Cloud", "alcatel-lucent.com", Sep. 28, 2012, pp. 1-23, Publisher: Alcatel-Lucent.
Ma et al., "Radiostar: Providing Wireless Coverage Over Gigabit Ethernet", "Bell Labs Technical Journal; Published online in Wiley InterScience (www.interscienc.e.wiley.com)", 2009, pp. 7-24, Publisher: Alcatel-Lucent.
"Small Cell Virtualization Functional Splits and Use Cases 159.05.1.01", "www.smallcellforum.org", Jun. 2015, pp. 58, Publisher: Small Cell Forum.
Zhu, Zhenbo et al., "Virtual Base Station Pool: Towards a Wireless Network Cloud for Radio Access Networks", May 3, 2011, pp. 1-10, Publisher: IBM Research, Published in: Yorktown Heights, US.
Small Cell Forum, "Small Cell Virtualization Functional Splits and Use Cases", 159.05.1.01, Small Cell Forum Release, www.smallcellforum.org, Jun. 2015 (58 pages).
Dotsch, Uwe, et al., "Quantitative Analysis of Split Station Processing and Determination of Advantageous Architectures for LTE", Bell Labs Technical Journal 18(1), 105-128, Alcatel-Lucent. Published by Wiley Periodicals, Inc., Published online in Wiley Online Library (wileyonlinelibrary.com), DOI: 10.1002/bltj.2159, copyright 2013 (24 pages).
U.S. Patent and Trademark Office, "Office Action", "from U.S. Appl. No. 15/189,473", dated Dec. 13, 2017, pp. 1-53, Published in: US.
U.S. Patent and Trademark Office, "Corrected Notice of Allowability", "from U.S. Appl. No. 13/762,292", dated Dec. 15, 2017, pp. 1-6, Published in: US.
U.S. Patent and Trademark Office, "Notice of Allowance and Fee(s) Due", "from U.S. Appl. No. 13/762,292", dated Nov. 30, 2017, pp. 1-31, Published in: US.
U.S. Patent and Trademark Office, "Notice of Allowance and Fee(s) Due", "from U.S. Appl. No. 14/734,311", dated Dec. 14, 2017, pp. 1-14, Published in: US.
U.S. Patent and Trademark Office, "Final Office Action", "From U.S. Appl. No. 15/230,936", dated Nov. 8, 2017, pp. 1-48, Published in: US.
United States Patent and Trademark Office, "Notice of Allowance", "From U.S. Appl. No. 14/734,311", dated Aug. 23, 2017, pp. 1-19, Published in: US.
United States Patent and Trademark Office, "Notice of Allowance", "From U.S. Appl. No. 13/762,292", dated Jul. 28, 2017, pp. 1-8, Published in: US.
European Patent Office, "Communication Pursuant to Article 94(3) for EP Application No. 15731443.6", "Foreign Counterpart to U.S. Appl. No. 14/734,311", dated Mar. 21, 2018, pp. 1-7, Published in: EP.
Australian Government IP Australia, "Examination Report from AU Application No. 2015274867 dated Sep. 24, 2018", from Foreign Counterpart to PCT Application No. PCT/US2015/034829, dated Sep. 24, 2018, pp. 1-3, Published: AU.
European Patent Office, "Communication Pursuant to Article 94(3) from EP Application No. 14707024.7 dated May 2, 2018", "from Foreign Counterpart of U.S. Appl. No. 13/762,283", dated May 2, 2018, p. 1-5, Published in: EP.
European Patent Office, "Notice of Publication from EP Application No. 14707024.7 dated Nov. 18, 2015", from Foreign Counterpart to U.S. Appl. No. 13/762,284, dated Nov. 18, 2015, p. 1 Published: EP.
International Bureau, "International Preliminary Report on Patentability from PCT Application No. PCT/US2014/015137 dated Aug.

(56) References Cited

OTHER PUBLICATIONS 20, 2015", from Foreign Counterpart to U.S. Appl. No. 13/762,284, dated Aug. 20, 2015, pp. 1-13, Published: Switzerland.
International Searching Authority, "International Preliminary Report on Patentability from PCT Application No. PCT/US2015/034829 dated Dec. 22, 2016", "from Foreign Counterpart of U.S. Appl. No. 14/734,311", dated Dec. 22, 2016, p. 1-11, Published in: WO.
International Searching Authority, "International Preliminary Report on Patentability from PCT Application No. PCT/US2016/064750 dated Jun. 21, 2018", "from Foreign Counterpart of U.S. Appl. No. 14/961,448", dated Jun. 21, 2016, pp. 1-11, Published in: WO.
International Searching Authority, "Invitation to Pay Addition Fees from PCT Application No. PCT/US2014/015137 dated Aug. 4, 2014", from Foreign Counterpart to U.S. Appl. No. 13/762,284, dated Aug. 4, 2014, pp. 1-8, Published: EP.
International Searching Authority, "Invitation to Pay Additional Fees from PCT Application No. PCT/US2015/034829 dated Oct. 1, 2015", from Foreign Counterpart to U.S. Appl. No. 14/734,311, dated Oct. 1, 2015, pp. 1-6, Published: EP.
U.S. Patent and Trademark Office, "Corrected Notice of Allowability from U.S. Appl. No. 15/230,936 dated Aug. 24, 2018" p. 1-10, Published in: US.
U.S. Patent and Trademark Office, "Corrected Notice of Allowability", U.S. Appl. No. 15/191,005, dated Aug. 15, 2018, pp. 1-6, Published: US.
U.S. Patent and Trademark Office, "Examiner-Initiated Interview Summary from U.S. Appl. No. 14/734,311 dated Mar. 23, 2017", p. 1-1, Published in: US.
U.S. Patent and Trademark Office, "Notice of Allowability", U.S. Appl. No. 14/734,311, dated May 1, 2018, pp. 1-8, Published: US.
U.S. Patent and Trademark Office, "Notice of Allowance from U.S. Appl. No. 15/191,005 dated Jan. 31, 2018" p. 1-10, Published in: US.
U.S. Patent and Trademark Office, "Notice of Allowance", U.S. Appl. No. 14/734,311, dated Apr. 19, 2018, pp. 1-12, Published: US.
U.S. Patent and Trademark Office, "Notice of Allowance", U.S. Appl. No. 15/189,473, datd Apr. 25, 2018, pp. 1-13, Published: US.
U.S. Patent and Trademark Office, "Notice of Allowance", U.S. Appl. No. 15/191,005, dated Mar. 20, 2018, pp. 1-13, Published: US.
U.S. Patent and Trademark Office, "Notice of Allowance", U.S. Appl. No. 15/230,936, dated Oct. 29, 2018, pp. 1-15, Published: US.
U.S. Patent and Trademark Office, "Notice of Allowance", U.S. Appl. No. 15/230,936, dated Jul. 2, 2018, pp. 1-15, Published in: US.
U.S. Patent and Trademark Office, "Notice of Allowance", U.S. Appl. No. 15/231,384, dated Nov. 28, 2018, pp. 1-15, Published: US.
U.S. Patent and Trademark Office, "Office Action", U.S. Appl. No. 15/191,005, dated Sep. 27, 2017, pp. 1-48, Published: US.
U.S. Patent and Trademark Office, "Office Action", U.S. Appl. No. 15/231,384, dated Jul. 12, 2018, pp. 1-82, Published: US.
U.S. Patent and Trademark Office, "Supplemental Notice of Allowability from U.S. Appl. No. 15/189,473 dated Jun. 13, 2018" p. 1-8, Published in: US.
U.S. Patent and Trademark Office, "Supplemental Notice of Allowability from U.S. Appl. No. 15/189,473 dated Jun. 5, 2018" p. 1-6, Published in: US.
U.S. Patent and Trademark Office, "Supplemental Notice of Allowability from U.S. Appl. No. 15/191,005 dated Mar. 29, 2018" p. 1-6, Published in: US.
U.S. Patent and Trademark Office, "Supplemental Notice of Allowability from U.S. Appl. No. 15/191,005 dated Apr. 11, 2018" pp. 1-8, Published in: US.
U.S. Patent and Trademark Office, "Supplemental Notice of Allowability from U.S. Appl. No. 15/191,005 dated Jun. 5, 2018" pp. 1-6, Published in: US.
United States Patent and Trademark Office, "Corrected Notice of Allowability for U.S. Appl. No. 15/230,936", dated Mar. 9, 2018, pp. 1-26, Published in: US.
U.S. Patent and Trademark Office, "Notice of Allowance", U.S. Appl. No. 15/230,936, dated Apr. 22, 2019, pp. 1-13, Published: US.
Australian Government IP Australia, "Notice of Acceptance for patent application from AU Application No. 2015274867 dated Apr. 16, 2019", from Foreign Counterpart to U.S. Appl. No. 14/734,311, pp. 1-3, Published: AU.
United States Patent and Trademark Office, "Notice of Allowance for U.S. Appl. No. 15/230,936", dated Feb. 9, 2018, pp. 1-10, Published in: US.
European Patent Office, "Extended European Search Report from EP Application No. 16873637.9 dated Jul. 5, 2019", from Foreign Counterpart to U.S. Appl. No. 14/961,448, pp. 1-13, Published: EP.
U.S. Patent and Trademark Office, "Office Action", U.S. Appl. No. 16/040,253, dated Feb. 1, 2019, pp. 1-68, Published: US.
European Patent Office, "Communication pursuant to Article 94(3) from EP Application No. 15731443.6 dated Feb. 5, 2019", from Foreign Counterpart to U.S. Appl. No. 14/734,311, dated Feb. 5, 2019, pp. 1-5, Published: EP.
U.S. Patent and Trademark Office, "Notice of Allowance", U.S. Appl. No. 16/040,253, dated Sep. 18, 2019, pp. 1-17, Published: US.
U.S. Patent and Trademark Office, "Office Action", U.S. Appl. No. 16/152,255, dated Jan. 2, 2020, pp. 1-93, Published: US.
U.S. Patent and Trademark Office, "Office Action", U.S. Appl. No. 16/152,266, dated Jan. 2, 2020, pp. 1-86, Published: US.
U.S. Patent and Trademark Office, "Office Action", U.S. Appl. No. 16/182,392, dated Dec. 31, 2019, pp. 1-105, Published: US.
U.S. Patent and Trademark Office, "Notice of Allowance", U.S. Appl. No. 15/230,936, dated Aug. 9, 2019, pp. 1-22, Published: US.
European Patent Office, "Communication under Rule 71(3) from EP Application No. 16873637.9", from Foreign Counterpart to U.S. Appl. No. 14/961,448, dated Mar. 9, 2020, pp. 1 through 45, Published: EP.
European Patent Office, "Communication pursuant to Article 94(3) from EP Application No. 16175955.0", from Foreign Counterpart to U.S. Appl. No. 13/762,283, dated Feb. 10, 2020, pp. 1-6, Published: EP.
Foreign European Patent Office, "Communication pursuant to Article 94(3) from EP Application No. 16175956.8", from Foreign Counterpart to U.S. Appl. No. 13/762,283, dated Feb. 10, 2020, pp. 1-8, Published: EP.
3GPP, "ARQ operation with HARQ-ARQ interaction", Nokia, 3GPP TSG-RAN WG2 Meeting #55, Oct. 2006, pp. 1 through 8, 3GPP, Seoul, Korea.
China National Intellectual Property Administration, "First Office Action from CN Application No. 201680080837.9", from Foreign Counterpart to U.S. Appl. No. 14/961,448, dated Jun. 30, 2020, pp. 1 through 31, Published: CN.

* cited by examiner

CONTROLLING DATA TRANSMISSION IN RADIO ACCESS NETWORKS

TECHNICAL FIELD

This disclosure relates to controlling data transmissions in radio access networks (RANs).

BACKGROUND

The widespread use of mobile devices, such as smartphones, has increased the demand for mobile data transmission capacity and for consistent and high-quality radio frequency (RF) coverage at in-building and other densely populated locations. Centralized radio access network (C-RAN) systems are being considered to meet this demand. In some implementations of C-RAN, a controller unit (CU) performs the majority of baseband processing, and remote units (RUs) perform RF processing and the remaining part of baseband processing. In C-RAN systems that support the long term evolution (LTE) standard, baseband processing in the CU may include critical real-time scheduling and hybrid automatic repeat request (HARQ) termination functions. This may place a constraint on the maximum round-trip latency that can be tolerated in the fronthaul network that is used to connect the CU and the RUs. In some cases, round-trip latency should be below a certain threshold, such as one millisecond (ms), to meet the most stringent timing requirement for HARQ. Such low latency may be achievable when the fronthaul network uses dedicated high-speed point-to-point links or a switched Ethernet network with low-latency switches. But, in other data networks that can be used in the fronthaul network in a C-RAN system, round-trip latency may exceed the threshold.

SUMMARY

An example communication system includes remote units, each which includes one or more radio frequency (RF) units to exchange RF signals with mobile devices, with at least some of the RF signals including information destined for, or originating from, a mobile device. In the example communication system, a controller is separated from the remote units by one or more networks. The controller is connected to an external network, and implements a scheduler. The scheduler is for allocating resources for transmission of data representing the information, and is configured to override a pending hybrid automatic repeat request (HARQ) transmission on a HARQ process by scheduling a new HARQ transmission on the HARQ process. The example communication system may include one or more of the following features, either alone or in combination.

The controller may be configured to accelerate retransmission of data in the HARQ transmission that was overridden. The scheduler may be configured to override the pending HARQ transmission for a mobile device when the scheduler does not have enough data waiting to be scheduled from other mobile devices having available HARQ processes to utilize all available radio link resources.

The controller may be configured to accelerate retransmission of data in the HARQ transmission that was overridden by performing operations that include: receiving, at the controller, an indication that data in the HARQ transmission that was overridden was not correctly received by the mobile device; in response to the indication, causing a radio link control instance associated with the mobile device to set a polling bit for the mobile device, with the polling bit for triggering transmission of a status message from the mobile device, and with the status message indicating an error in one or more data packets received by the mobile device; and receiving the status message from the mobile device.

The controller may be configured to accelerate retransmission of data in the HARQ transmission that was overridden by performing operations that include: receiving, at the controller, an indication that data in the HARQ transmission that was overridden was not correctly received by the mobile device; and in response to the indication, causing a radio link control (RLC) instance associated with the mobile device to retransmit, absent receipt of a status message, the data in the HARQ transmission that was overridden.

The controller may be configured to accelerate retransmission of data in the HARQ transmission that was overridden by performing operations that include: receiving, at the controller, an indication that data in the HARQ transmission that was overridden was not correctly received by the mobile device; and in response to the indication, causing the controller to retransmit data that is, at least in part, identical to the data that was overridden as part of a one or more new HARQ transmissions. Retransmitting the data may include: prioritizing transmission of the one or more new HARQ transmissions; and assigning physical downlink shared channel (PDSCH) resource blocks to the one or more new HARQ transmissions, with downlink control information being sent to the mobile device and comprising a new data indicator bit set to indicate a new HARQ transmission.

The controller may be configured to accelerate retransmission of data in the HARQ transmission that was overridden by performing operations that include configuring the mobile device to include a timer that runs until expiration, with the timer having a value to delay transmission of a status message from the mobile device to the controller by a radio link control instance.

The controller may be configured to accelerate retransmission of data in the HARQ transmission that was overridden by performing operations that include: triggering transmission of a status message to the mobile device via a radio link control instance upon detecting that data in the HARQ transmission that was overridden was not correctly received, with the status message indicating an error in the data; and receiving, from the mobile device and in response to the status message, a retransmission of data in the HARQ transmission that was overridden.

An example communication system may include remote units, each of which includes one or more radio frequency (RF) units to exchange RF signals with mobile devices, with at least some of the RF signals including information destined for, or originating from, a mobile device. The example communication system includes a controller separated from the remote units by one or more networks. The controller is connected to an external network, and implements a scheduler. The scheduler is for allocating resources for transmission of data representing the information. The controller is configured to cause the mobile device to accelerate retransmission of the data in response to an indication of an error in transmission of the data. The example communication system may include one or more of the following features, either alone or in combination.

The data may be part of a hybrid automatic repeat request (HARQ) transmission that was overridden, and the controller may be configured to accelerate retransmission of the data by performing operations that include receiving, at the controller a negative cyclic redundancy check (CRC) report for the HARQ transmission that was overridden. The controller may be configured to trigger transmission of a status message in response to the negative CRC report, the status message indicating an error in the data.

The data may be part of a hybrid automatic repeat request (HARQ) transmission that was overridden, and the controller may be configured to accelerate retransmission of the data by performing operations that include: weaving triggering transmission of a status message to the mobile device into normal operations of a radio link control instance in the controller, with the status message indicating the error in data transmission; and receiving, from the mobile device, a retransmission of the data in response to the status message.

The controller may be configured to accelerate retransmission of the data by performing operations that include: detecting, at a media access control instance of the controller, an unrecoverable error for an overridden HARQ transmission sent by the mobile device; and sending cross-layer indications to radio link control instances in the controller to place timers in an expired state, resulting in transmission of a status message to the mobile device, the status message indicating an error in the data.

The mobile device may be configured to operate in a subframe bundling mode.

An example communication system includes remote units, each of which includes one or more radio frequency (RF) units to exchange RF signals with mobile devices, with at least some of the RF signals including information destined for, or originating from, a mobile device. The example communication system includes a controller separated from the remote units by one or more networks. The controller is connected to an external network. The controller is for implementing a scheduler. The scheduler is for allocating resources for transmission of data representing the information in a hybrid automatic repeat request (HARQ) transmission. The scheduler is configured to override a data transmission in a pending HARQ process, where overriding the data transmission in the pending HARQ process includes scheduling a new data transmission in the pending HARQ process. The controller is configured to accelerate the new data transmission response to detection of an error in the data transmission that was overridden. The example communication system may include one or more of the following features, either alone or in combination.

The controller may be configured to accelerate the new data transmission by performing operations that include: receiving, at the controller, an indication that data for the pending HARQ process was not correctly received by the mobile device; in response to the indication, causing a radio link control instance associated with the mobile device to set a polling bit for the mobile device, with the polling bit for triggering transmission of a status message from the mobile device, and with the status message indicating an error in one or more data packets received by the mobile device; and receiving the status message from the mobile device.

The controller may be configured to accelerate the new data transmission by performing operations that include: receiving, at the controller, an indication that data for the pending HARQ process was not correctly received by the mobile device; and in response to the indication, causing a radio link control instance associated with the mobile device to retransmit data absent receipt of a status message.

The controller may be configured to accelerate the new data transmission by performing operations that include: receiving, at the controller, an indication that that data for the pending HARQ process was not correctly received by the mobile device; and in response to the indication, causing the controller to retransmit the data as part of a one or more new hybrid automatic request (HARQ) transmissions. Retransmitting the data as part of a one or more new HARQ transmissions may include: prioritizing transmission of the one or more new HARQ transmissions; and assigning physical downlink shared channel (PDSCH) resource blocks to the one or more new HARQ transmissions, with downlink control information sent to the mobile device comprising a new data indicator bit set to indicate a new HARQ transmission.

The controller may be configured to accelerate the new data transmission by performing operations that include configuring the mobile device to include a timer that runs until expiration, with the timer having a value to delay transmission of a status message from the mobile device to the controller by a radio link control instance.

The controller may be configured to accelerate the new data transmission by performing operations that include: triggering transmission of a status message to the mobile device via a radio link control instance upon detecting that data in the pending HARQ transmission was not correctly received, with the status message indicating an error in the data; and receiving, from the mobile device, a retransmission of the data from the pending HARQ transmission in response to the status message.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented by, in, or using one or more apparatus, methods, or electronic systems that each can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

The systems and techniques described below are example implementations of features that may be included in a radio access network. The claims made herein are not limited to the example implementations described below.

Figure 1:
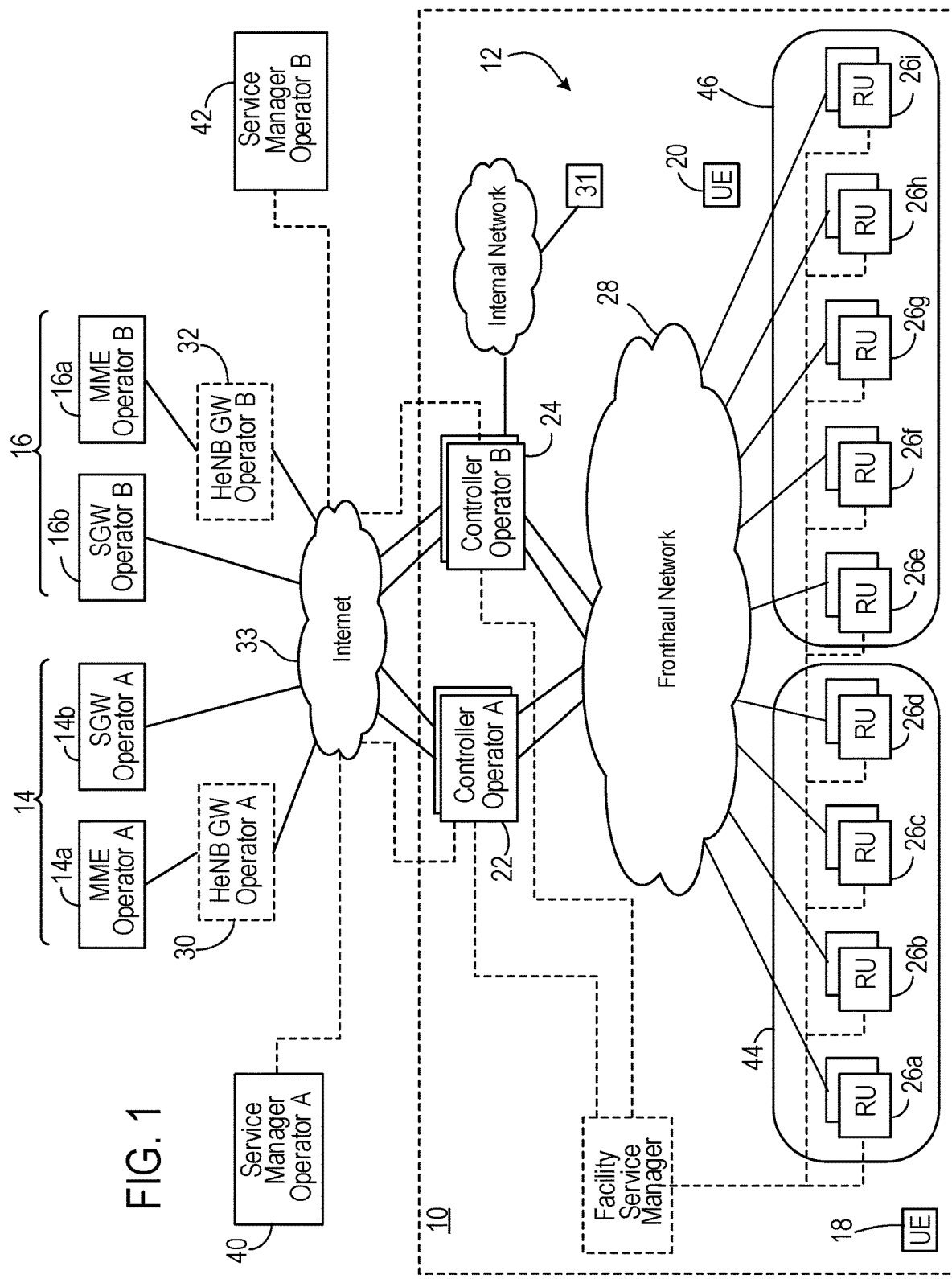
FIG. 1 is a block diagram of an example of a radio network.

Referring to FIG. 1, an example radio network 12 is deployed on a site 10 so that one or more mobile operators, such as operator A 14 or operator B 16, can provide mobile network access to one or more instances of user equipment (UE(s)) 18, 20, such as smartphones, at site 10. The radio network 12 of FIG. 1 can be implemented with various air interface technologies. For example, 4G LTE may be used. LTE is a standard developed by 3GPP, a standards organization. The site may be an enterprise or corporate building, a public venue, such as a hotel, hospital, university campus, or even an outdoor area such as a ski area, a stadium, or a densely-populated downtown area or a city.

The radio network 12 includes controllers, each of which is also referred as a controller unit (CU) The CUs may contain one or more processors or other processing devices on which code is executed to perform at least some network and baseband modem functions. The processors can include hardware formed by integrated circuits (ICs) and/or other electrical components, such as system on chips (SoCs). Each CU 22, 24 may contain one or more baseband modem processors or may be configured to perform the functions of one or more baseband modems. In some implementation, one or more of the CUs may be implemented using network function virtualization (NFV) as a virtualized software application running on a virtual machine/hypervisor. The virtual machine/hypervisor may run on a hardware that is shared with other virtualized applications. The hardware may include one or more servers and/or other computing devices. In some implementations, each CU manages one or more of the remote units (RUs) 26a, 26b, 26c, 26d, 26e, 26f, 26g, 26h, 26i ("26a-26i").

The RUs (also called radio points (RPs)) may be controlled by the CUs and may include hardware, such as radio transceivers and SoCs. The RUs 26a-26i may contain RF transceivers to transmit RF signals to and from UEs and to perform RF front-end functions, among other functions. The RUs may have transmit antennas that are integral thereto or that are external and connect to the RUs via antenna cables. In some implementations multiple RUs served by a CU may belong to the same cell. In some implementations based on the LTE standard, multiple RUs may transmit the same Physical Cell ID (PCI). RUs that belong to the same cell may transmit to different UEs in the same time-frequency resource. RUs in the same cell may transmit the same cell-specific reference signals and the same control signals. In some implementations, a CU may serve multiple cells. In some examples, there may be less software functionality running on the RUs than on CUs 22, 24. In some implementations, the RUs are configured to perform no baseband modem functionality. In some implementations, the RUs may perform some baseband modem functionality. For example, in the LTE standard, the RUs may implement Fast Fourier Transform (FFT) and Inverse FFT (IFFT) functions. In some implementations, the RUs may perform additional downlink baseband modem functions. For example, RUs may perform all, or the vast majority of, physical layer (described below) functions. In this regard, transmission of data to the UE is referred to as downlink (DL), and transmission of data from the UE is referred to as uplink (UL).

Baseband modems in the CUs and the RUs may be connected through a network 28. In some implementations, network 28 may be an Ethernet network comprised of one or more Ethernet switches, which may be, arranged in a tree-like configuration. In some implementations, all CUs and RUs at site 10 are connected to each other through network 28. In some implementations, one or more other types of computer networks (wired or wireless) are used in addition to, or instead of, an Ethernet network.

In this regard, the portion of network 28 that connects the RUs to the CUs is called the fronthaul, and the time taken for the transmission of data over the fronthaul is called fronthaul delay or (fronthaul) latency. In this example, CUs 22, 24 are also connected (backhauled) to an operator's core network. The operator's core network may include a security gateway (SeGW) and nodes defined in the LTE standard, such as mobility management entities (MME) 14a, 16a and serving gateways (SGW) 14b, 16b. The backhaul connection to the operator's core network may be implemented, in part, through home eNodeB gateways (HeNB GW) 30, 32.

CUs 22, 24 may also connect to the operator's core network via the Internet or other IP-based packet transport network 33. As used herein, "the Internet" may include other networks. When multiple CUs are present as in the example of FIG. 1, one CU may act as an aggregation point and present a single eNodeB network interface towards one or more nodes in the core network; e.g., a SeGW, a MME, a HeNodeB gateway (GW), and/or a SGW. In some implementations, the CUs may also include MME functionality (not shown) and SGW functionality (not shown). Traffic may therefore flow directly between a UE and a destination node 31 on the Internet or on an internal network (e.g., an IP network) at site 10 without traversing the operator's core network.

Each CU may be associated with a mobile operator so that RUs managed thereby may operate on a spectrum that belongs to that mobile operator. A CU may also be shared between multiple mobile operators. Among other things, the CUs may schedule traffic to/from the UEs by assigning resources for over-the-air transmission. Each CU 22, 24 is also connected to a service manager 40, 42 in the example of FIG. 1, which is typically located in the operator's core network. The service manager is responsible for the configuration, activation and monitoring of the radio network. There may also be a local facility service manager, which can allow local information technology (IT) personnel to install and to maintain the radio network.

In some implementations, each CU 22, 24 performs, for each cell it serves, the functions of a base station, except for certain baseband modem and RF functions that may be performed by the RUs. Generally, a base station, such as a small cell, includes a digital baseband modem unit and a network processing unit. In the example system of FIG. 1, the processing baseband functionality (or "baseband functionality") for a cell is split between the CU and the RUs, with each performing at least some of the baseband functionality.

LTE baseband processing functionality may be implemented on network nodes in hardware and/or software. The baseband processing functions that make up the LTE baseband processing functionality are often described in terms of protocol layers, which include the following. The physical layer carries information from a media access control (MAC) layer over an RF interface. Physical layer functions typically include encoding/decoding, modulation/demodulation, precoding and equalization. Functions of the MAC layer include mapping between logical channels and transport channels, and multiplexing of MAC service data units (SDUs) from one or different logical channels onto transport blocks (TB) to be delivered to the physical layer, fast error correction through HARQ, allocating LTE resources to UEs via real-time scheduling (described below), and priority handling between logical channels of one or more UEs. Functions of the radio link control (RLC) layer (above the MAC layer) typically include transfer of upper layer PDUs, such as concatenation, segmentation and reassembly, and error correction through ARQ. In this regard, HARQ and automatic repeat request (ARQ) are retransmission protocols that support reliable communication between devices. Functions of the packet data convergence control (PDCP) layer (above the RLC layer) include handling (among other things) header compression and decompression of IP (Internet Protocol) data, integrity protection of control plane data, and ciphering and deciphering of user plane data and control plane data. Higher layer LTE protocols include the radio resource control (RRC) control sub-layer.

In some implementations, real-time scheduling includes assigning user data to time and/or frequency LTE resources. Real-time scheduling is based on CSI (channel state information) and other information. In DL scheduling, CSI is supplied by the UE. In the LTE standard, the DL CSI may include a channel quality indicator (CQI), precoding matrix indicator (PMI), and rank indicator (RI), sent by the UE. In UL scheduling, channel state is determined by a CU based on transmissions received from the UEs, including DL CSI. In the LTE standard, channel state may also be determined based on the signals transmitted by the UE, for example, the sounding reference signal (SRS).

Each CU can include one or more baseband modems. The baseband modems may be for performing functions of all layers of baseband functionalities, including the MAC/RLC/PDCP layer processing, and upper layer RRC processing. For example, real-time scheduling and HARQ termination, which are part of the MAC layer, may be performed in the CUs. The CUs may also perform physical layer processing. In addition, the CUs may perform other functions similar to a traditional base station, such as the function of a network processing unit, e.g., processing IP data. In some implementations, the CUs do not perform any RF functions.

In some implementations all physical layer functions are implemented in the RUs, and only the baseband functions of the MAC layer and above are implemented in the CUs. In some implementations, the physical layer functions are split between the CUs and RUs. Uplink control channel receiver functions, such as the physical uplink control channel (PUCCH), physical random access channel (PRACH), and SRS, may be implemented in whole or in part in the RUs, whereas the uplink PUSCH receiver functions may be substantially implemented the CUs. The functional split between the CU and the RU may be different on the downlink and on the uplink. In some implementations, substantially all downlink physical layer functions can be implemented in the RUs and a majority of uplink physical layer functions are implemented in the CUs. In other implementations, all physical layer functions are implemented in the CU.

Radio Network Deployment

Figure 2:
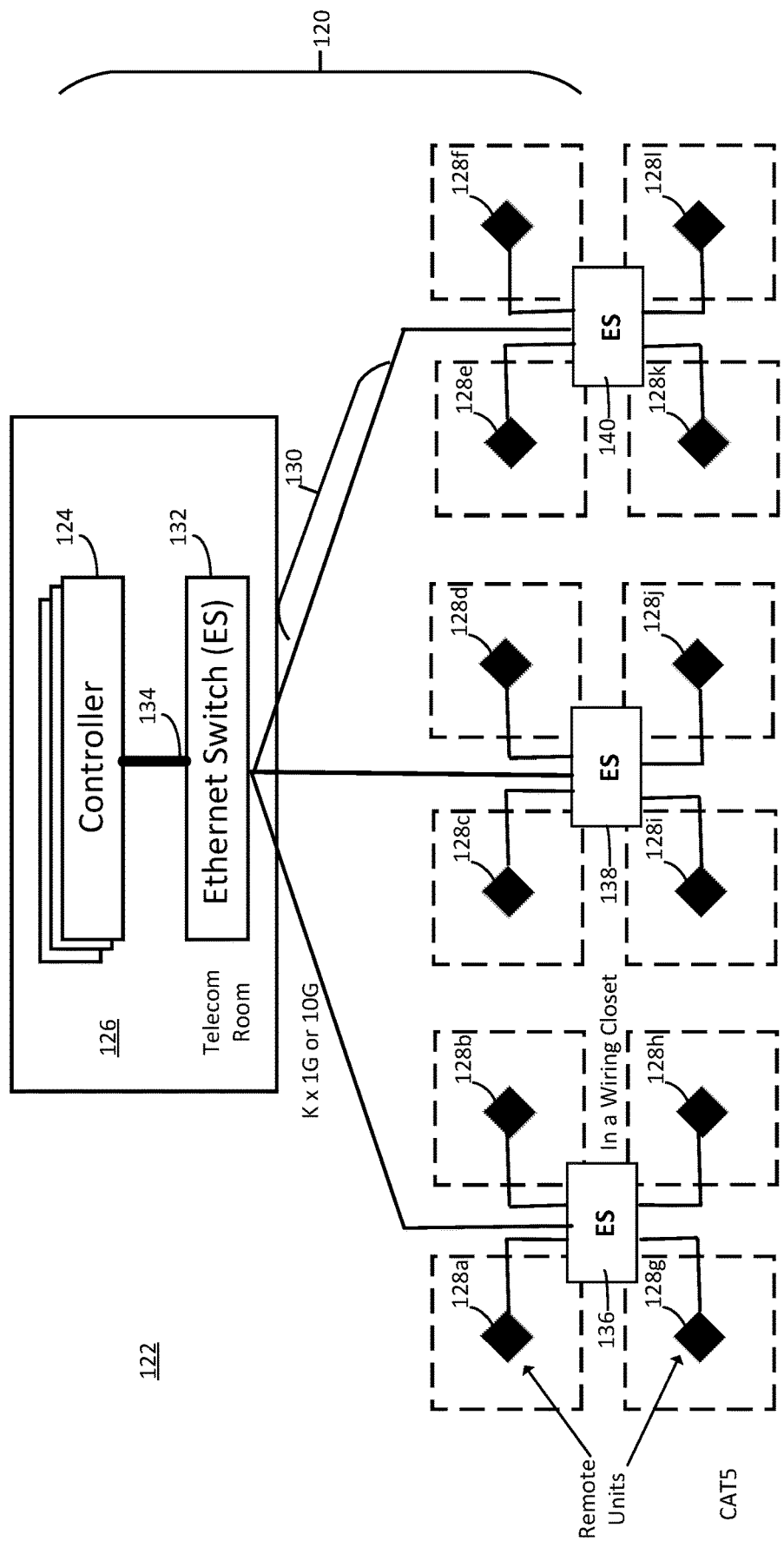
FIG. 2 is a block diagram showing deployment of an example radio network of the type shown in FIG. 1 at a site, such as a building or other area.

Referring to FIG. 2, an example radio network 120 is deployed at a site 122. The example radio network of FIG. 2 may be an implementation of, and include all or some of the structure and function of the radio network shown in FIG. 1. In the example of FIG. 2, one or more controllers (CUs) 124 are installed in a room 126, e.g., a telecom room, locally at site 122. CUs may also be deployed off-site and can serve RUs deployed in multiple sites. RUs 128a-128l are distributed throughout site 122. In some implementations, some RUs are wall-mounted with integrated antennas, some RUs are hidden in one or more closets, and some RUs are installed above ceiling tile and attach to a wall-mount antenna via an external antenna cable.

In some implementations, the RUs 128a-128l connect to the CUs 124 through a switched Ethernet network 130, which includes twisted pair and/or fiber optic cables, and one or more Ethernet switches. Other types of networks may be used in the example of FIG. 2 in addition to, or instead of, switched Ethernet network 130. In some implementations, the Ethernet network 130 is dedicated to the radio network alone. In some implementations, radio network 120 shares Ethernet network 130 with other local area traffic at the site 122. For example, in an enterprise network such other traffic may include local traffic generated by various computers in the enterprise that may be connected to the same Ethernet switches. The radio network traffic can be segregated from other traffic by forming a separate virtual local area network (VLAN). High-priority QoS (quality of service) can be assigned to the VLAN to control latency. In the example shown in FIG. 2, the CUs 124 are connected to a co-located Ethernet switch 132 (e.g., in the same room 126). In some implementations, the connection 134 to switch 132 uses a single 10 Gb/s Ethernet link running over fiber optic or Category 6 twisted pair cable, or multiple 1 Gb/s Ethernet links running over Category 5/6 twisted pair cables.

Figure 3:
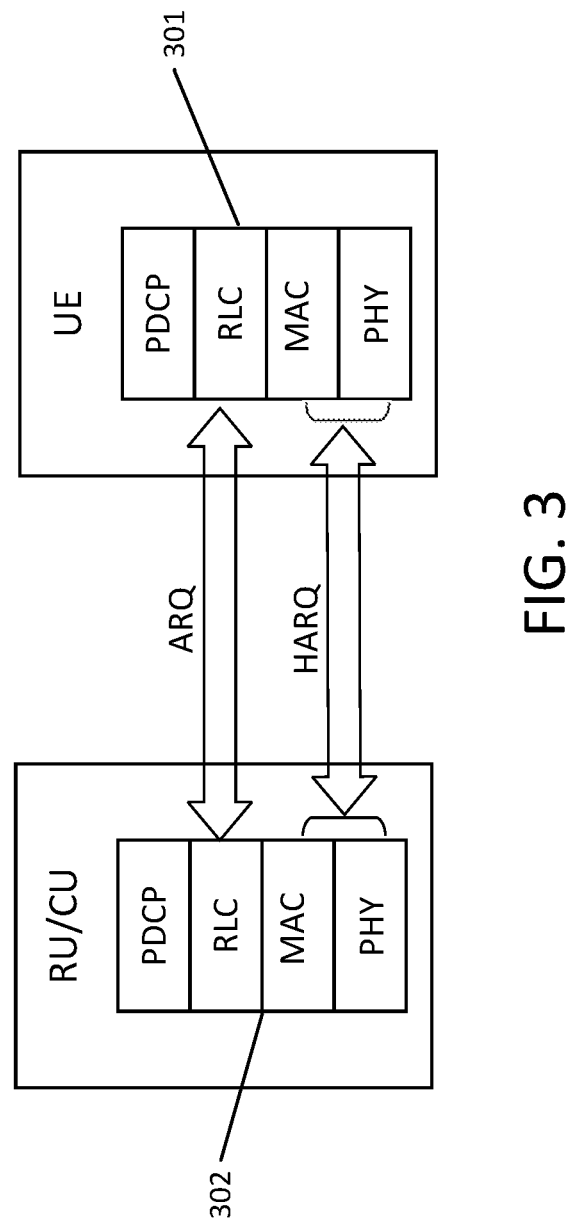
FIG. 3 is a block diagram showing an example of communications between a controller CU/remote unit (RU) and a mobile device.

In a radio network, such as the radio networks illustrated in FIGS. 1 and 2, communication between a UE and an RU can be divided into several distinct groups of related functions or layers. Data to be sent over a network passes through each of the layers, where the data may be divided into packets. Some examples of these layers are described above and include the following: the packet data convergence protocol (PDCP) layer, the radio link control (RLC) layer, the medium access control (MAC) layer, and the physical layer (PHY). FIG. 3 illustrates example hierarchies 301, 302 of layers that are included in CUs, RUs, and UEs such as those of FIGS. 1 and 2.

Figure 4:
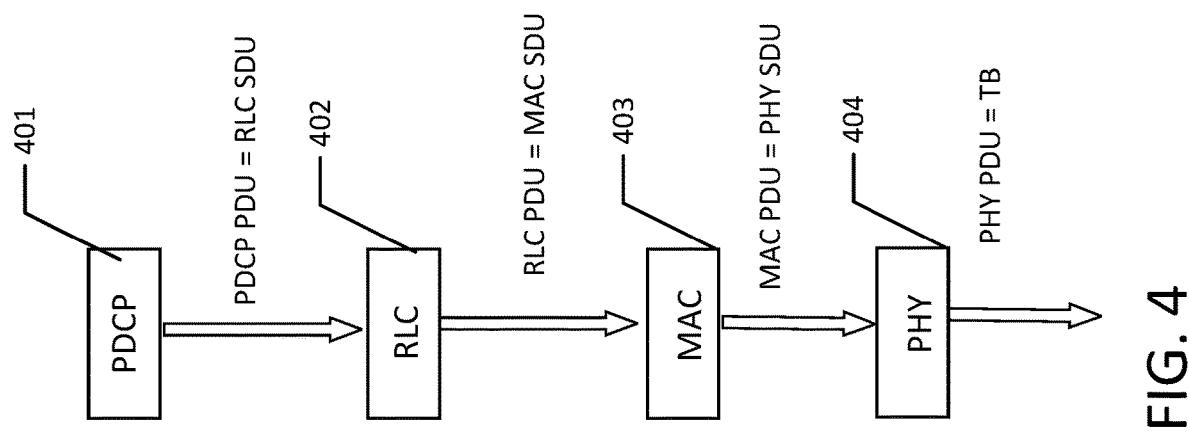
FIG. 4 is a block diagram showing example communications through different communication layers of a network device.

FIG. 4 illustrates example communication between protocol layers. In a node that is transmitting packets, a packet received by a layer from the layer above is called service data unit (SDU), while the packet provided to a lower layer is the protocol data unit (PDU). In the example of FIG. 4, the PDU includes a unit of data that is specified in a protocol of a given layer and that includes protocol header information and possibly user data of that layer. As illustrated in FIG. 4, the PDU of the PDCP layer 401 becomes the SDU of the RLC layer 402, and the PDU of the RLC layer becomes the SDU of the MAC layer 403. PHY layer 404 is used to carry MAC PDUs, also called transport blocks (TBs). An RLC SDU can be segmented into multiple RLC PDUs or multiple RLC SDUs can be combined into a single RLC PDU using length indicator (LI) fields. A real-time scheduler in the CU may determine an appropriate size of the transport block.

The protocol stack applies to both the DL and the UL. In this context, the RU and the CU are referred to collectively as "RU/CU", since one or both of the RU and CU may implement, or be part of, the communications depicted. Transmission of data from the RU/CU to the UE is the downlink (DL), and transmission of data from the UE to the RU/CU is the uplink (DL). In the DL, the RU/CU is the transmitter and the UE is the receiver. In the UL, the UE is the transmitter and the RU/CU is the receiver. HARQ enables fast retransmissions between the MAC/PHY layers of UE 301 and RU/CU 302.

HARQ and RLC Operation

User experience in LTE may depend on several metrics, including, e.g., data throughput (amount of data packets passing through the network), delay jitter (variation in packet delay), and packet error rate (rate of errors in transmitted data packets). In some communication protocols, such as Transmission Control Protocol (TCP), packet error rate needs to be very low (e.g., $10^{-5}$ or lower). However, aiming for a very low error rate in the first transmission of a TB over-the-air (OTA) may unnecessarily lower the achievable throughput. Therefore, communication protocols such as LTE are designed to aim for a moderately high error rate in a first over-the-air transmission, and then to rely on fast retransmissions to correct any errors. Examples of fast retransmission procedures to accelerate correction of errors are described herein. The retransmission of data includes re-sending data that is, at least in part, identical to the data that was originally transmitted. For example, in the case of HARQ retransmission, the payloads of the original data and the retransmitted data may identical.

In some examples, fast error correction can be achieved using HARQ transmissions in the MAC/PHY layers operating with a target error rate of 10% for a first transmission. To reduce delay jitter, HARQ retransmissions may be relatively fast. In some implementations, this can be achieved using a single-bit feedback channel with target error probability of $10^{-4}$ to $10^{-3}$. Since HARQ feedback is not sufficiently reliable for TCP operation, additional ARQ retransmissions are also supported in the RLC layer. RLC retransmissions correct residual HARQ errors that may be, e.g., due to four consecutive HARQ retransmission errors or errors in the HARQ feedback channel. The RLC protocol, in its acknowledged mode (AM) of operation, uses CRC-protected (cyclic redundancy check—protected) feedback to correct for residual errors in HARQ. RLC AM also provides reordering to correct out-of-sequence reception of RLC PDUs. While HARQ errors can be corrected through retransmission within as little as 8 ms, RLC retransmissions can take 50 ms to 100 ms.

Each UE in a radio network such as those of FIGS. 1 and 2, may have one or more radio bearers, which represent a different traffic type that may need different treatment from the radio network. Radio bearers carry either signaling traffic (Signaling Radio Bearer, or SRB) or data traffic (Data Radio Bearer). In some implementations, each radio bearer has its own PDCP instance, RLC instances and a MAC Layer Logical Channel ID (LCD). In this context, an instance may be implemented in computer-executable code that, when executed, enables communication via a particular layer. Each PDCP instance may be associated with one or two RLC instances (downlink and uplink). Each RLC instance can be configured to operate in AM. A PDCP instance can operate independently from RLC and MAC instances, and can encapsulate IP packets or radio resource control (RRC) messages into PDCP PDUs (which are RLC SDUs). An RLC SDU can be segmented into multiple RLC PDUs or multiple RLC SDUs can be combined into a single RLC PDU using Length Indicator (LI) fields.

In LTE, there is a tight coupling between the RLC and the MAC layers. A real-time scheduler determines the transport block size (TBS) based on the size of UE data waiting in a buffer and available airlink resources. The real-time scheduler may be implemented in a CU. Multiple RLC PDUs, represented as MAC SDUs, can be multiplexed in a single MAC PDU, which forms the TB. Each MAC SDU (RLC PDU) is identified in the MAC PDU header by a MAC SDU header, which includes a 5-bit Logical Channel ID (LCID) to identify the radio bearer (or PDCP instance) that the data belongs to, and a Length Indicator (LI) to identify the length of the MAC SDU. When a TB is not correctly received (e.g., after 4 HARQ retransmissions), all AM RLC PDUs that are carried by the TB are retransmitted by the RLC layer. TBs usually carry complete RLC PDUs but, in an RLC retransmission, the original RLC PDU can be segmented and split across multiple TBs.

A component of the RLC ARQ procedure is a Status Report (SR), which is an example of a status message, generated by the receiver of an RLC instance (e.g., on the DL the RLC receiver in the UE, or on the UL the RLC receiver in the CU). For example, a Status Report may be generated, e.g., by a UE following receipt of RLC PDUs from a CU. Among other things, a Status Report identifies errors in RLC PDUs received by the receiving RLC instance. For example, in some implementations, the Status Report indicates, to the transmitting RLC instance (e.g., the RLC instance that is transmitting RLC PDUs), the sequence numbers (SNs) of PDUs that were not correctly received. In a case of re-segmentation during RLC retransmission, the Status Report may also identify specific segments within an RLC PDU that were not correctly received. The Status Report may also identify the first RLC PDU not yet received, indirectly acknowledging the PDUs up to that PDU as correctly received. In some implementations, the Status Report may also include other information not described herein.

In response to receipt of a Status Report, a transmitting RLC instance may retransmit all or some data previously transmitted, thereby effectively correcting error(s) identified in, or implied by, the Status Report. Status Reports may be sent with relatively high priority and high reliability, in some cases employing cyclic redundancy checks (CRCs) to detect any transmission errors. Transmission of a Status Report from an RLC instance receiver can be triggered, e.g., by one or more of the following: expiration of a t-reordering timer (a configurable parameter), or explicit polling by the RLC instance transmitter. In this regard, when an RLC instance receiver detects a missing RLC PDU, it starts a t-reordering timer, and if the condition is not corrected prior to the expiration of the timer, a Status Report is sent. In order to prevent frequent Status Report transmissions, a configurable t-StatusProhibit timer may be used. This timer is started when a Status Report is sent, and no new Status Report is sent while this timer is still running. The t-reordering timer may be long enough to allow HARQ to complete its retransmissions, such that when a HARQ retransmission delays the arrival of an RLC PDU, a Status Report will not be sent. In some examples, the t-Reordering and t-StatusProhibit timers used in the UE on the downlink can take values in the range [0, 200] ms and [0, 500] ms, respectively. In some implementations, default values for the UE (downlink RLC) are 35 ms and 0 ms, respectively. In some implementations of LTE, an RLC instance transmitter can send up to 512 RLC PDUs without receiving a Status Report indicating correct receipt of the transmitted 512 RLC PDUs.

Downlink

The example features described below may be implemented in, but are not limited to use in, a radio network, such as those shown in FIGS. 1 and 2.

Figure 5:
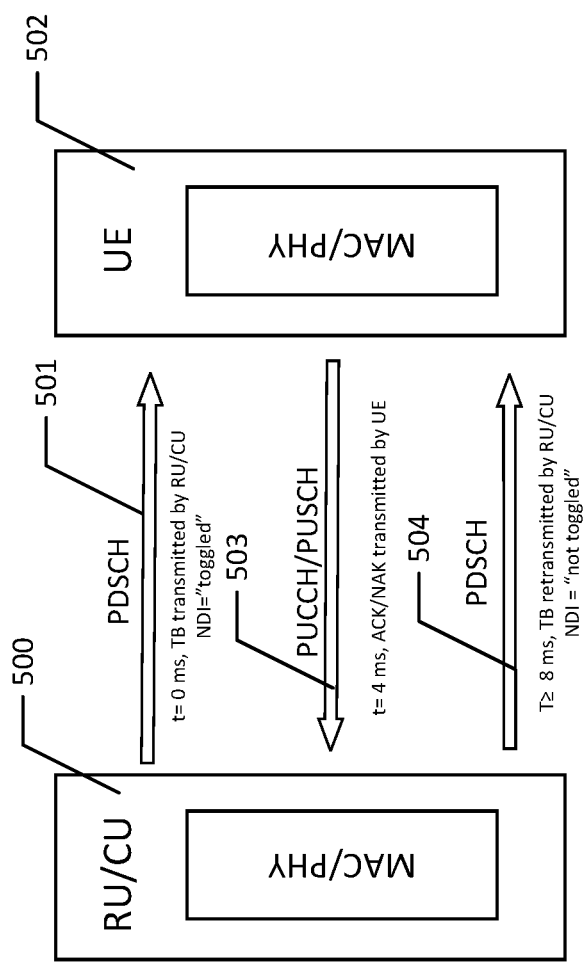
FIG. 5 is a block diagram showing of communications between a RU/CU and user equipment (UE), such as a mobile device.

FIG. 5 is a block diagram of example operations in the transmission of data in a downlink using HARQ. In this example, a TB is transmitted (501) from the MAC/PHY layer of RU/CU 500 over the physical downlink shared channel (PDSCH) to the MAC/PHY layer of UE 502 at time t=0 ms. When the UE receives the TB from the RU/CU, it sends (503) an ACK/NAK (acknowledged/not acknowledged) signal 4 ms later over the physical uplink control channel (PUCCH) or over the physical uplink shared channel (PUSCH), depending on whether the UE has been allocated PUSCH resources by the real-time scheduler in the CU. Upon receiving a NAK, the RU/CU can retransmit (504) the TB, at any time at or after 8 ms have elapsed since a first transmission. Retransmissions can be sent on any resource block using any appropriate modulation and coding scheme (MCS).

Figure 6:
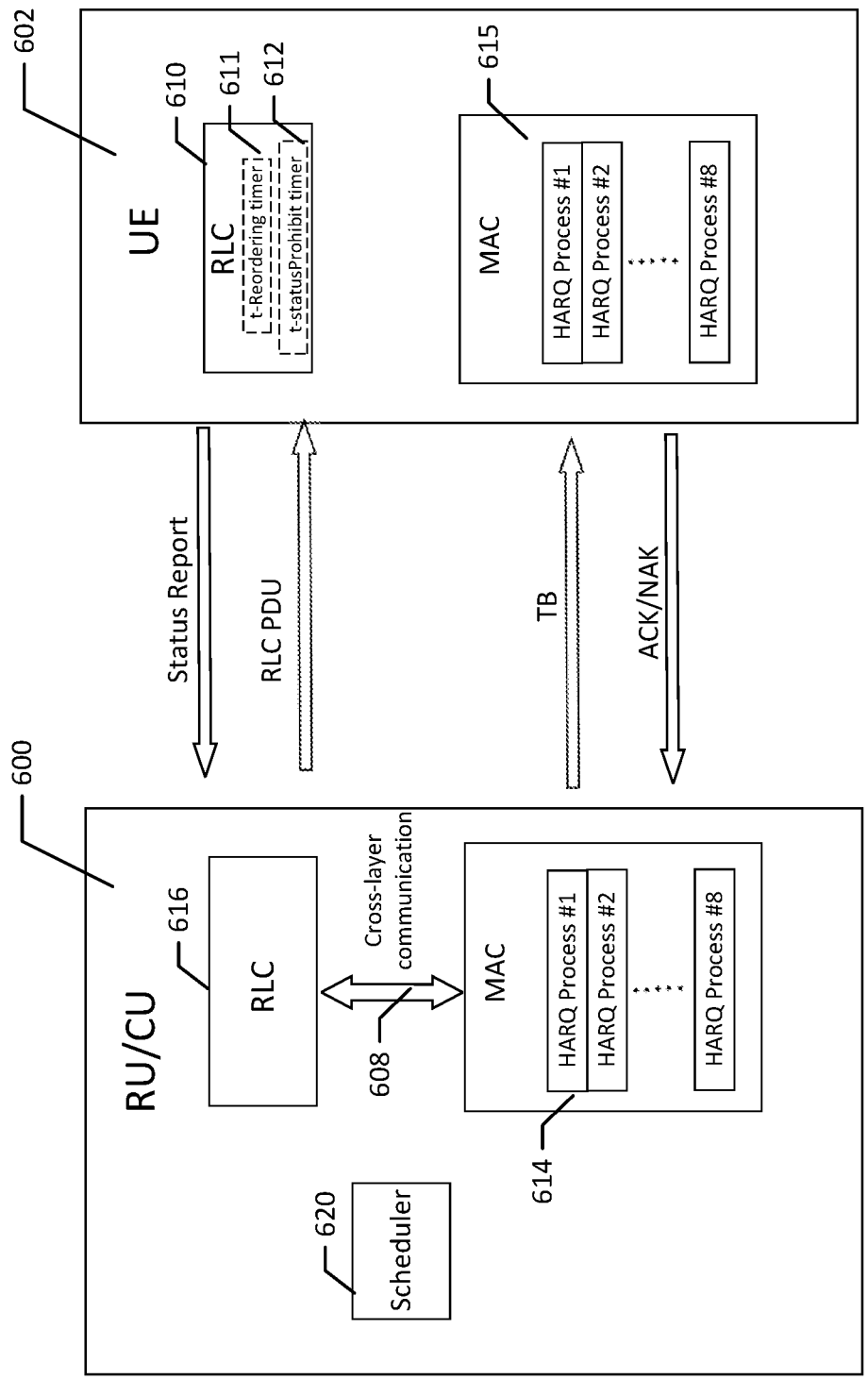
FIG. 6 is a block diagram showing communication between media access control (MAC) and radio link control (RLC) layers in an RU/CU and UE, and communications between the RU/CU and the UE.

As shown in FIG. 6, in addition to each MAC layer 614, 615, each RLC layer 616, 610 can also be involved in downlink (DL) HARQ transmissions. The RLC layer 616 and the MAC layer 614 may communicate with each other through cross layer communication. In some implementations, DL HARQ supports a maximum of eight HARQ processes, e.g., for a UE up to eight unacknowledged TB transmissions can exist at any given time. Since DL retransmissions can occur on any TTI, RU/CU 600 sends the HARQ process number to UE 602 explicitly in a Downlink Control Indication (DCI) message sent over Physical downlink control channel (PDCCH) (see 503 of FIG. 5). When using spatial multiplexing, the RU/CU may send two TBs in the same TTI using two spatial layers and receive two separate ACK/NAK bits in response thereto. When a NAK is received for one of the layers, the corresponding TB can be retransmitted on the same layer, together with a new transmission sent on the other layer, using the same HARQ process. Therefore, in some implementations, the RU/CU may identify only one HARQ process number even when spatial multiplexing is in use.

The RU/CU also indicates, to the UE, whether a PDSCH transmission represents new data by toggling a new data indicator (NDI) bit in the DCI. The NDI bit may be configured to allow the UE to work-around HARQ feedback errors. For example, when the UE sends a NAK message, but the NAK message is received as an ACK message by the RU/CU, the RU/CU may send a new TB on the same process with the NDI set as "toggled". Upon correctly receiving the new TB, the UE empties its HARQ soft receive buffer and tries to decode the new TB. The old TB, with the RLC PDUs contained therein, will be lost and will be retransmitted by the RLC instance in AM. Without the NDI bit, the UE may have tried to use the new transmission to decode the old TB. This can lead to further latency. Alternatively, when the UE correctly receives a PDSCH TB, the UE delivers it to the MAC layer instance and sends an ACK to the RU/CU. If the ACK is received as a NAK or a discontinuous transmission (DTX), the RU/CU will retransmit the same TB on the same HARQ process with the NDI set as "not toggled." The UE will recognize the feedback error, ignore the retransmission and simply re-send the ACK message.

As shown in FIG. 6, in DL HARQ, RLC instance 610 in the UE may also contain a t-reordering timer 611 and a t-statusProhibit timer 612. When the t-reordering timer expires, the RLC instance in the UE sends a Status Report to an RLC instance in the RU/CU.

Uplink

The example features described below may be implemented in, but are not limited to use in, a radio network, such as those shown in FIGS. 1 and 2.

Figure 7:
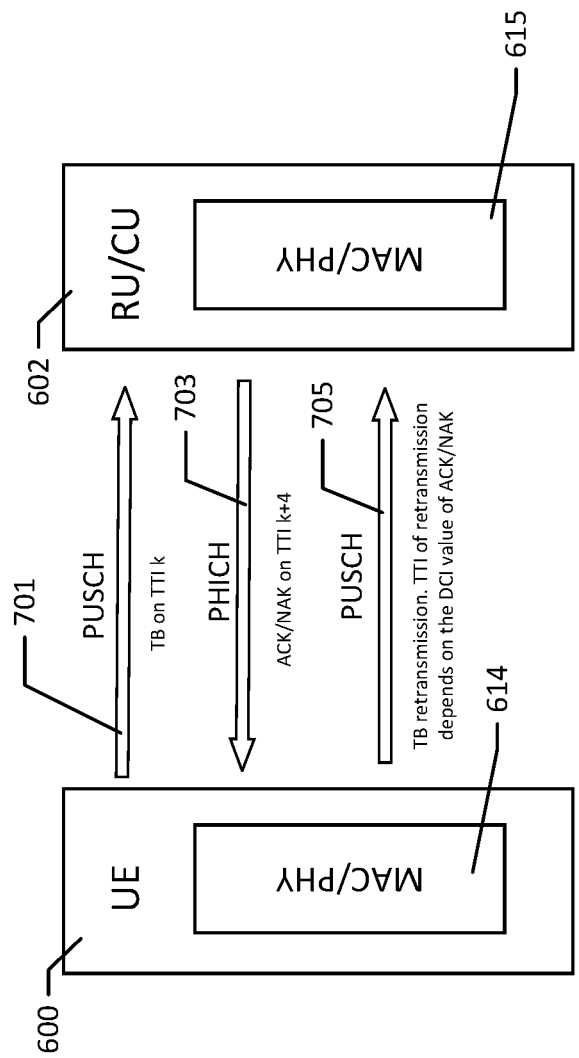
FIGS. 7 and 8 are block diagrams showing examples of uplink communications between a RU/CU and UE.

Uplink (UL) HARQ processes use a synchronous form of HARQ. FIG. 7 illustrates an example of a UL HARQ process. In the example of FIG. 7, The MAC/PHY layer 614 of a UE 600 transmits 701 a TB in a TTI k (where "k" is an integer representing milliseconds greater than zero) over a PUSCH to the MAC/PHY layer 615 of RU/CU 602. On the UL, the RU/CU sends 703 an ACK/NAK message on the Physical Hybrid-ARQ Indicator Channel (PHICH) in TTI k+4, 4 ms after receiving the PUSCH transmission from the UE on TTI k. In this example, a NAK means the PUSCH transmission in TTI k was received in error. Thereafter, a retransmission is requested on TTI k+8 using the same resource blocks (RBs) and modulation parameters as the transmission on TTI k. In other words, a NAK not only serves as a negative acknowledgment, but also as an uplink resource allocation for the retransmission (non-adaptive retransmission). An ACK does not mean that the PUSCH transmission in a given TTI was correctly received. Upon receiving an ACK, the UE does not immediately clear its HARQ transmit (Tx) buffer, unless the UE receives an accompanying DCI Type-0 message carrying a resource allocation for TTI k+8 with a toggled NDI bit. If the ACK is not accompanied by a DCI Type-0 message, the actual meaning of the ACK can be determined by the UE after the UE receives an uplink allocation for the same HARQ process. For example, if the UE receives an uplink allocation on TTI k+12 for transmission in TTI k+16 with the NDI bit toggled (indicating a new data transmission), the UE can conclude that the ACK received in TTI k+4 really meant a correct reception. Therefore, the UE can clear the HARQ transmit (Tx) buffer for that process. If the NDI bit is not toggled (retransmission), the UE may conclude that the ACK received in TTI k+4 was received in error, and retransmit 705 the TB in TTI k+16. The RB allocation can also occur later, for example in TTI k+20, for transmission over the air in TTI k+24. Accordingly, by sending an uplink allocation in the same TTI as the ACK in TTI k+4, the CU can achieve a relatively fast retransmission time (in this example, 8 ms), (same as in the case of NAK) except in an adaptive manner (e.g., using different resource blocks and/or modulation and coding scheme).

Another aspect of HARQ is the use of a redundancy version (RV). In example versions of LTE HARQ, there are four possible RVs that correspond to different sets of coded data. On both the downlink and the uplink, the RV is explicitly indicated in a resource allocation message by a two-bit index carried in the DCI. When using non-adaptive retransmissions based on a NAK on the uplink, the UE follows a specific fixed sequence {0, 2, 3, 1} of RVs in retransmissions. In adaptive retransmissions, DL or UL, the RV is explicitly indicated. A HARQ receiver can perform soft-combining either using chase combining, which involves combining transmissions of the same RV, or incremental redundancy, which provides combining for different RVs. In turbo coding, there may be situations where chase combining gives better performance than incremental redundancy soft combining.

Figure 8:
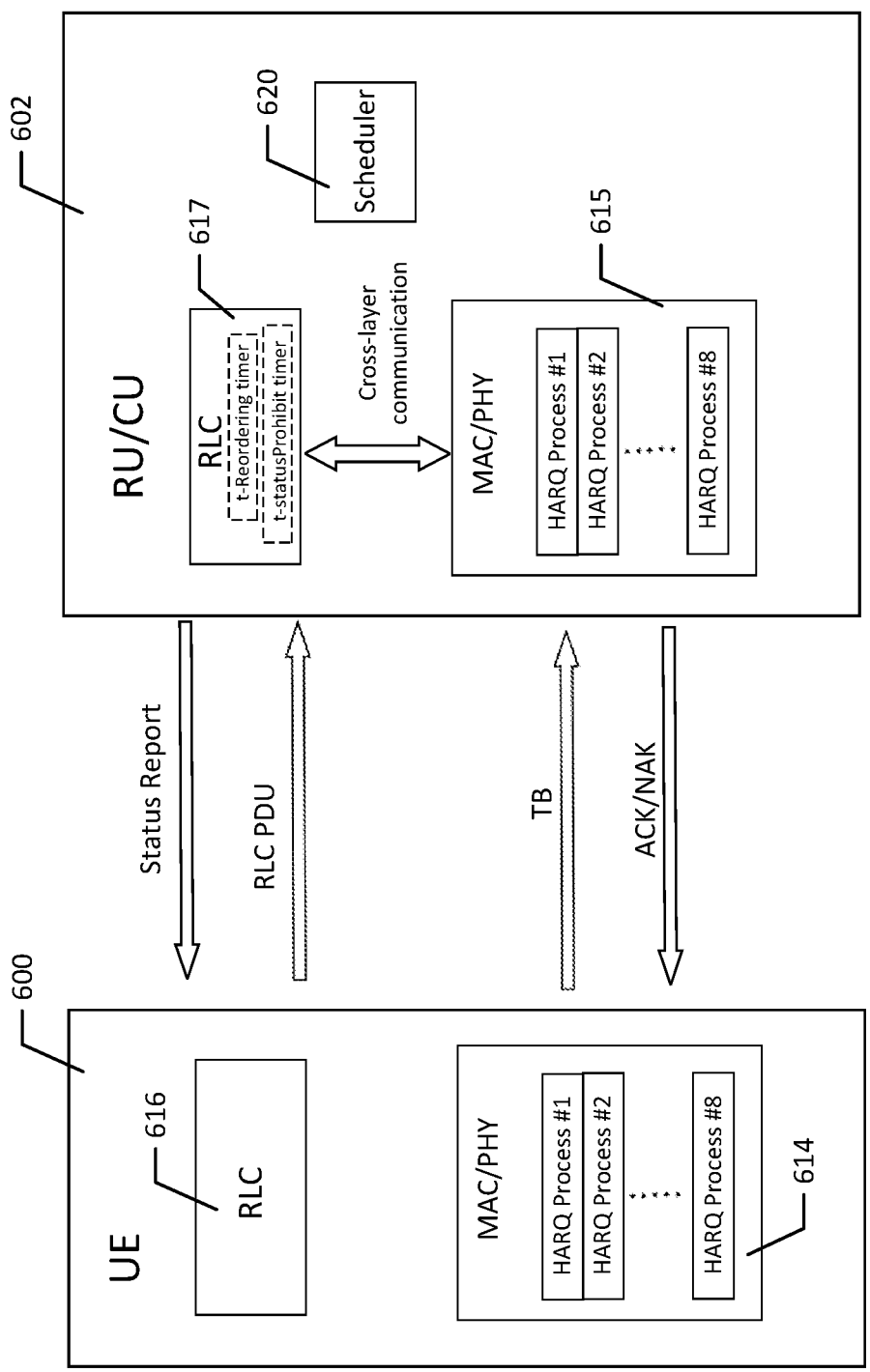

As illustrated in FIG. 8, in an example, UL HARQ also supports eight processes, but these processes are tied to a specific TTI: transmissions on TTI k belong to HARQ process k (mod 8). The MAC/PHY layers in RU/CU communicate with their respective RLC layer through cross-layer communication. The RLC in the RU/CU has a t-Reordering time and a t-statusProhibit timer. Upon expiration of the t-Reordering timer, the RU/CU can send a Status Report to the RLC layer in the UE. In FIG. 8, scheduler 620 schedules communications to/from the UE, as described herein.

Relaxing of Latency Constraint in Downlink HARQ

The example features described below may be implemented in, but are not limited to use in, a radio network, such as those shown in FIGS. 1 and 2.

On the DL, HARQ latency constraints can be relaxed by delaying data retransmission from the CU when a NAK message is received in response to an initial data transmission. Delaying retransmissions may delay the recovery of lost data. This may have some impact on overall throughput. However, if the latency is relatively small (e.g., on the order of 5-10 milliseconds), the decrease in throughput will be insignificant. Since frequency division duplex (FDD) LTE supports eight HARQ processes, in "normal" LTE HARQ operation, the CU will suspend transmissions to a UE if the CU has eight unacknowledged HARQ processes pending for that UE. For example, if HARQ retransmissions are delayed by 4 ms (sent 12 ms after previous transmission), the percentage of TTIs, on which the UE can be consecutively scheduled, is reduced from 100% to 66%. This is because, after the UE is scheduled in eight consecutive TTIs, no new transmission is scheduled for the next four TTIs. To generalize the example above, when retransmissions are delayed by "p" ms, HARQ suspension will reduce the percentage of TTIs available for scheduling a specific UE by p/(8+p), or 33% for p=4 ms, 50% for p=8 ms, and 67% for p=16 ms. Reductions in available TTIs for a UE does not necessarily imply a reduction in total system throughput. If the remaining TTIs can be filled with data for other UEs, total system throughput may be maintained. In situations where data demand is concentrated in a single UE, suspension of a UE's transmission can cause a reduction in that UE's throughput.

Figure 9:
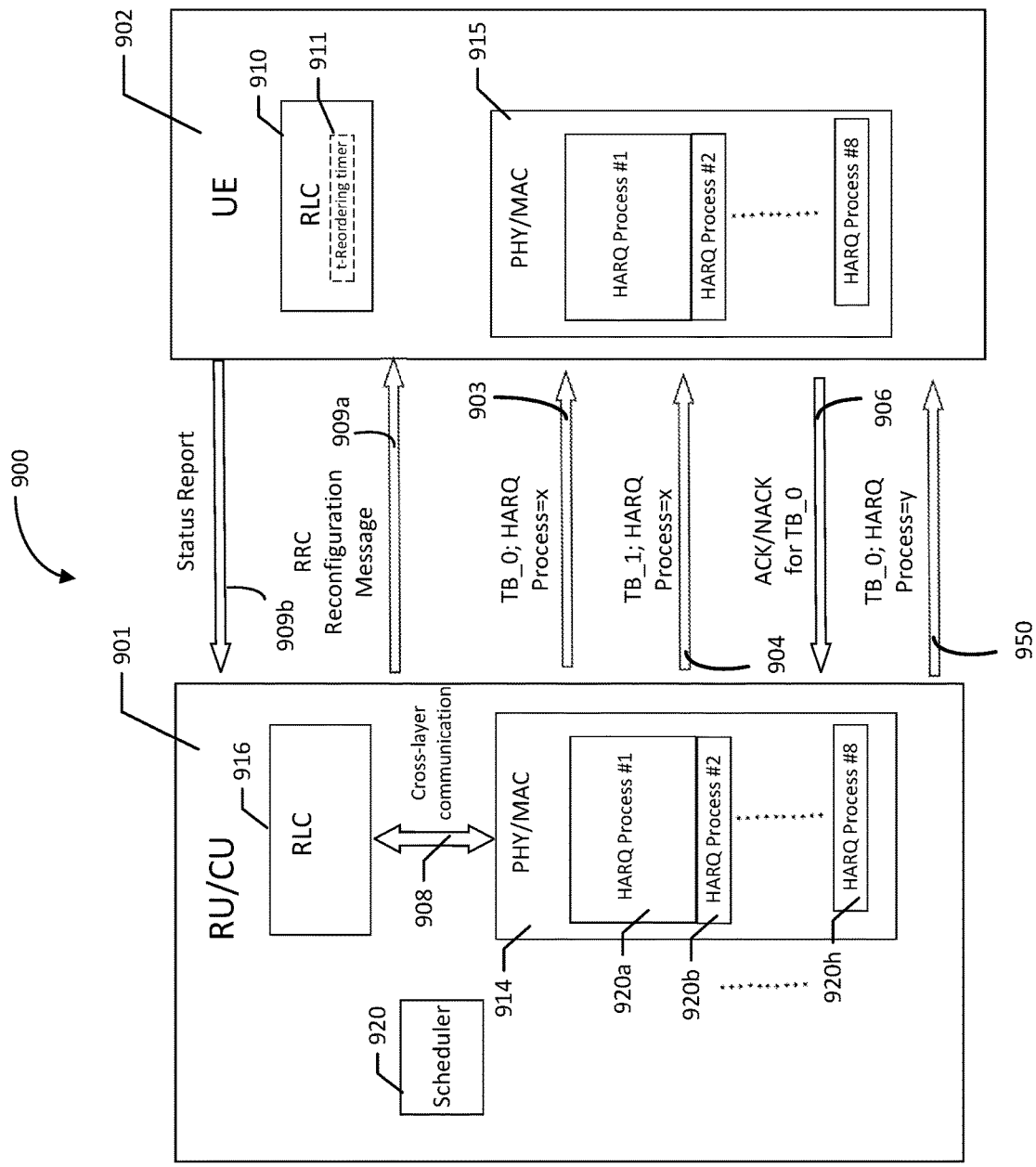
FIG. 9 is a block diagram showing example actions performed in a process for relaxing latency constraint in downlink HARQ.

Referring to FIG. 9, in an example implementation 900, in spite of delay in HARQ retransmissions, actions can be taken to reduce the impact of the delay on UE throughput. For example, when the UE 902 has all its eight HARQ processes 920*a*-920*h* pending; e.g., no ACK message is yet received for any of the TBs previously sent on eight different HARQ processes, CU 901 can still send 904 a new TB on any of the pending HARQ processes with the new data indicator (NDI) set as "toggled," which indicates that the current TB is a new TB (here, "TB_1"). On receiving TB_1 at UE 902, previously transmitted TB 903 (e.g., TB_0) on the same HARQ process (shown here as "HARQ Process=x") is/are overridden. As a result, the HARQ for TB_0 is effectively turned off. The UE 902, upon receiving 904 TB_1 on a HARQ process for which the UE 902 sent 906 an ACK/NAK, will clear old data (belonging to TB_0) from its HARQ receive soft buffer. As long as the UE 902 is receiving data correctly and sending ACK messages, the UE 902 can continue to receive new TBs in every TTI and can, in some cases, operate at its peak rate. If TB_0 is received 903 by the UE 902 in error, the UE 902 will send 906 a NAK message to the CU. However, if prior to receiving a retransmission of TB_0, the receive soft buffer in the UE where TB_0 is stored is overridden by TB_1, then it is up to the RLC layer to recover the lost data of TB_0 through communication 909*a* between the RLC layers of the RU/CU 901 and UE 902, as described herein.

Delayed HARQ retransmissions may present a trade-off to the scheduler 920 in the RU/CU 901. For example, if a given UE (e.g., UE_0) is to be scheduled in a TTI and an ACK/NAK message is not yet available for any of the UE's eight pending HARQ processes 920*a*-920*h* due to high fronthaul latency or any other reason (e.g., errors in PDSCH or ACK/NAK transmissions), and there are no other UEs with data in buffer waiting to be scheduled, the RU/CU 901 can continue to transmit to the UE by turning off HARQ for one or more of the pending TBs. When the PDSCH RBs in the TTI can be allocated to other UEs with available HARQ processes, the scheduler can, in some examples, skip allocating any RBs to UE_0 without significantly affecting total system throughput. Otherwise, the scheduler 920 can allocate resource blocks (RBs) to UE_0 and accept disabling of HARQ for pending TB(s) on that process. In some cases, the scenario described above, where a UE has all its eight HARQ processes 920*a*-920*h* pending, may occur more frequently as the fronthaul latency increases.

When the scheduler 920 determines to allocate PDSCH RBs to a UE_0 on a pending HARQ transmission, resulting in the pending HARQ transmission being overridden, the scheduler 920 can implement one or more of the following operations to accelerate recovery of overridden TB(s). The recovery operations may be implemented in RLC or MAC layer instances on one or more appropriate devices.

In some implementations, the RU/CU 901 may accelerate transmission 909*b* of the RLC Status Report by a UE 902 by configuring the UE with a t-reordering timer 911 that is less than a default value. After the timer expires, a Status Report is automatically sent from the UE 902 to the RU/CU 901. As described herein, the Status Report identifies data that was correctly received by the UE 902 and data that was not yet correctly received by the UE. For example, the Status Report may identify missing RLC PDUs. For example, missing RLC PDUs can be related to TB_0 sent by MAC layer 914 in the CU that was not successfully received by the MAC layer 915 in the UE. Alternatively, the Status Report may identify what data was received correctly and the sender (e.g., the RU/CU) may determine, from its own records, what data the UE did not correctly receive.

The timer 911 may be configured by sending appropriate configuration messages 909*a* from the RU/CU 901 to the UE 902. The RU/CU 901 may configure UEs with a t-reordering timer (for example, timer 911) by communicating to processing device(s) on the UEs, and programming those processing devices with appropriate timers. Configuring the timer in this manner may accelerate recovery of lost data via transmission of the configuration message 909*a* from the RLC layer 916 in the CU and 910 in the UE, by triggering more quickly a Status Report transmission 909*b* in response to expiration of the t-reordering timer 911.

In some implementations, a MAC instance 914 in the RU/CU 901 receives 906 a delayed NAK message from the UE 902 for an overridden TB, for example TB_0. In response, the MAC instance in the RU/CU 901 may send instructions to all or some RLC instances in the CU (for example, through cross-layer communication 908) for which PDUs were carried in TB_0 to trigger each RLC instance to set a Status Report polling bit in the next RLC PDU sent to the UE. This Status Report polling bit triggers the corresponding RLC instance in the UE 902 to transmit 909*b* a Status Report immediately. This method may thus accelerate recovery of lost data via the RLC layer by triggering a Status Report transmission from the UE.

In some implementations, instead of waiting for a Status Report from an RLC instance in the UE 902, the RU/CU 901 may itself trigger a retransmission at the RLC instance(s). This method employs a cross-layer interaction between the RLC and MAC/PHY layers. For example, an association may be maintained between MAC PDUs (TBs) and RLC SNs or segments that are carried therein. When a TB is lost, a MAC instance in the RU/CU 901, upon receipt 906 of the delayed NAK, sends a request, for example, through cross layer communication 908, to the RLC instance(s) 916 in the RU/CU 901 instructing the retransmission of the lost RLC PDUs or segments without waiting for a Status Report to arrive from the UE 902. This method may thus accelerate recovery of lost data via the RLC layer by retransmission without requiring a UE Status Report.

In some implementations, upon receiving 906 a delayed NAK for an overridden TB, the MAC layer 914 in the CU 901 may retransmit 950 the same TB (e.g., TB_0) as new HARQ data on any available HARQ process. To do this, the scheduler 920 in the CU may prioritize the overridden TB and assign PDSCH RBs to the overridden TB. The PDSCH data will be indicated using a DCI having an NDI toggled to indicate that the TB is new. In other words, the system prioritizes transmission of the one or more new HARQ transmissions; and assigns PDSCH resource blocks to the one or more new HARQ transmissions, with downlink control information sent to the mobile device including a new data indicator bit set to indicate a new HARQ transmission.

UE 902 therefore receives the resulting transmission, treats this transmission as new transmission, and attempts to decode the new transmission. To increase the likelihood of successful transfer and receipt, the scheduler 920 may not allow this new TB to be overridden again so that HARQ is not disabled a second time. The scheduler 920 may also allocate excess RBs to the UE and apply back-off to the modulation and coding scheme (MCS) of the TB in order to increase the likelihood of successful transfer and receipt.

Retransmitting the TB as new HARQ data (e.g., in response to receiving a delayed NAK for an overridden TB) can be advantageous. For example, retransmitting the TB as a new HARQ data may be relatively easy to implement because, in some implementations, it need not rely upon any cross-layer communication 908 between RLC 916 and MAC 914 layers. In some examples, to increase the reliability of this method, it may be beneficial to increase the value of the RLC t-reordering timer (e.g., to 50 ms). Doing so may reduce the likelihood that the UE will send a Status Report prior to receiving the retransmitted TB as new HARQ data that produces a premature retransmission for RLC PDUs that were carried in the overridden TB before receiving the new transmission of the same TB data.

In some implementations, downlink transmissions may tolerate longer fronthaul delays by using a combination of one or more of: delayed HARQ retransmissions, occasionally reusing HARQ processes while those HARQ processes are still pending thus effectively disabling HARQ for an earlier transmission, and using fast retransmissions in the MAC/PHY or RLC layers to correct for possible errors in earlier transmissions when HARQ is disabled as a result of overriding a pending HARQ process. In some implementations, round-trip fronthaul latencies of 8 ms (or more) can be supported by the processes described herein. However, the implementations described herein are not limited to supporting 8 ms latencies; even higher latencies can be supported.

Relaxing of Latency Constraint in Uplink HARQ

The example features described below may be implemented in, but are not limited to use in, a radio network, such as those shown in FIGS. 1 and 2.

Figure 10:
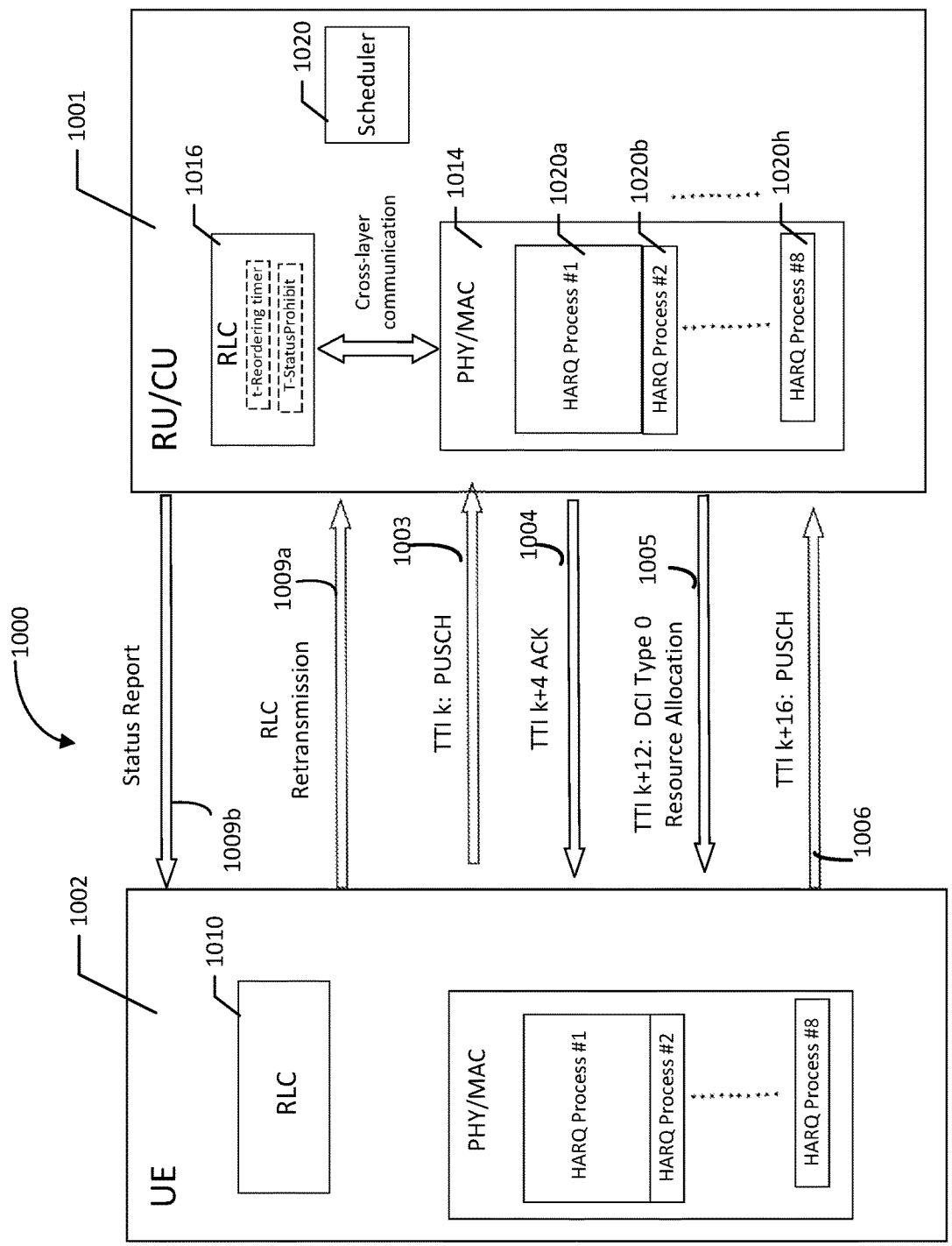
FIG. 10 is a block diagram showing example actions performed in a process for relaxing latency constraint in uplink HARQ.

Referring to FIG. 10, in an example implementation 1000, latency constraints in uplink HARQ can be relaxed. On the uplink, increased fronthaul latency may delay receipt of a UE PUSCH transmission at the RU/CU. For a PUSCH transmission received 1003 in a TTI k (where k is an integer representing milliseconds greater than 0) at the RU/CU 1001, the RU/CU 1001 can defer scheduling a HARQ retransmission by forcibly sending 1004 an ACK on the PHICH without a DCI Type 0 in TTI k+4, and can schedule a retransmission 8 ms later in TTI k+12 by sending 1005 a DCI Type 0 for an adaptive retransmission 1006 in TTI k+16. This can accommodate an 8 ms increase in the round-trip fronthaul latency. Such an approach may lead to a reduction of throughput. For example, an 8 ms increase in the round-trip fronthaul latency may lead to a reduction of the percentage of TTIs that UE can be scheduled from 100% to 50%. With such delayed retransmissions, for example, when a UE is scheduled in TTI k, that UE cannot be rescheduled in TTI k+8. Thus, in some cases, when the UE needs to be scheduled in every TTI, its throughput will be reduced by 50%.

When long fronthaul delay causes PUSCH data to arrive 1003 late at the CU 1001, actions can be taken to reduce UE throughput degradation on the uplink. This can be done, for example, if the scheduler 1020 determines that the scheduler is not able to meet the UE's data demand or when the scheduler does not have enough demand from other UEs to utilize available resources. In that case, the scheduler 1020 can optionally override a pending HARQ process by scheduling a new HARQ transmission on the same HARQ process. For example, in FIG. 11, the scheduler 1020 can override a pending HARQ process by allocating resources to the UE 1002 for new data. This can be achieved by sending 1007, in TTI k+4, an ACK on the PHICH together with an uplink resource block (RB) allocation for a new transmission on DCI Type 0. The new PUSCH transmission will occur on TTI k+8 1008. This effectively disables HARQ for the overridden PUSCH TB, which the UE had transmitted 1003 in TTI k. If that PUSCH TB is received 1003 by the CU 1001 in error, a way to recover the PUSCH TB is for the UE 1001 to retransmit the corresponding data at the RLC layer. This process may be used in some cases because there is no mechanism in the LTE MAC layer for the UE to retransmit a TB in the HARQ/MAC layer after the UE is allocated RBs for a new transmission on the same HARQ process.

Figure 11:
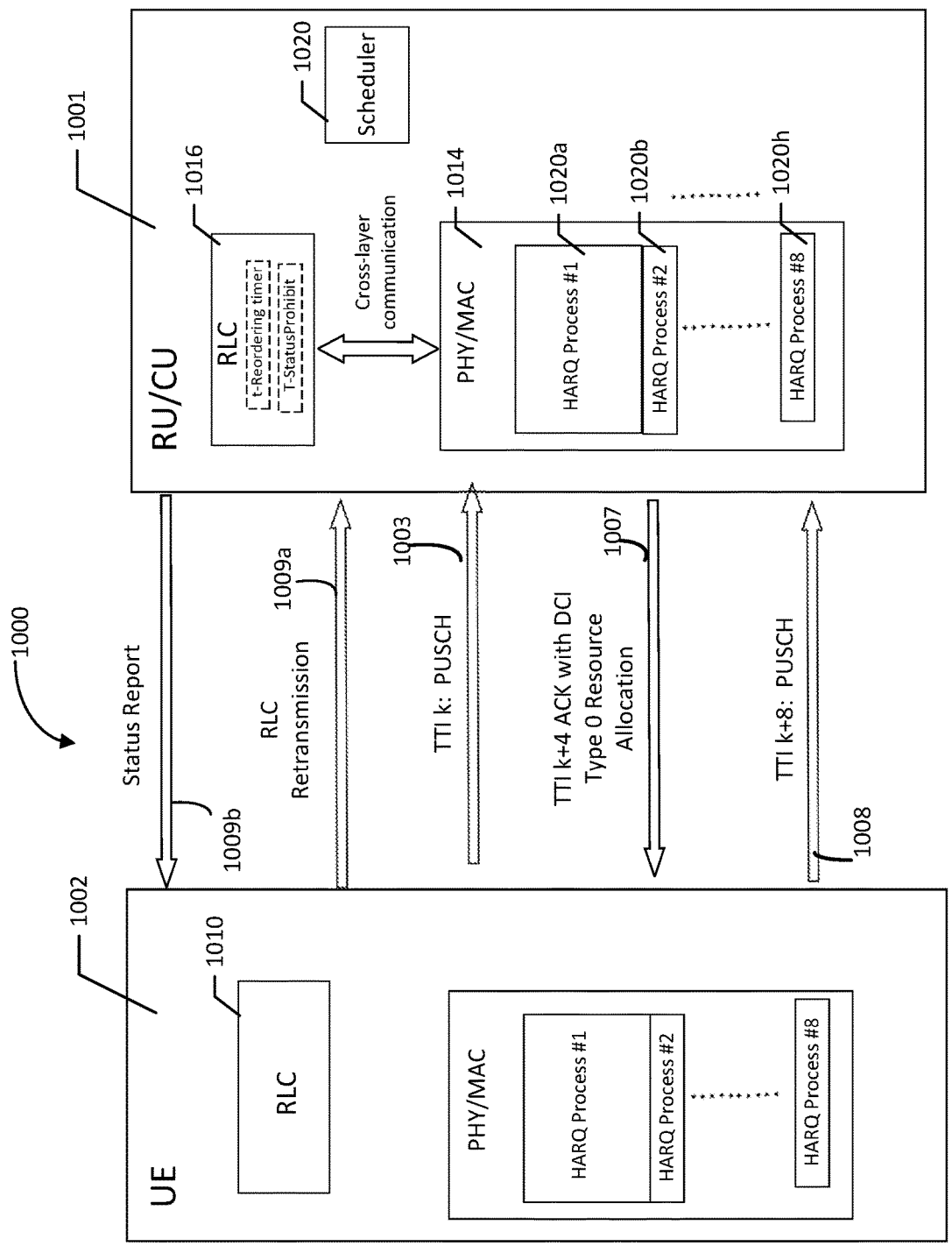
FIG. 11 is a block diagram showing example actions performed in a process for relaxing latency constraint in uplink HARQ.

As illustrated in FIGS. 10 and 11, at the RLC layer, the UE 1002 will retransmit 1009a an RLC PDU upon receiving 1009b a Status Report from the peer RLC instance in the CU 1001 indicating that the RLC PDUs were not correctly received. In this example, assuming no prior errors, the RLC instances 1016 in the CU 1001 may transmit 1009b a Status Report under one of two conditions: a) the RLC 1016 detects the missing RLC PDU after correctly receiving another RLC PDU with a higher sequence number, or b) the RLC 1016 receives a Status Report poll from a peer RLC 1010 instance in UE 1002.

To speed-up RLC retransmission of lost data by a UE, after the PHY/MAC instance 1014 in the CU receives the overridden PUSCH TB in error, the PHY/MAC instance in the CU can send a trigger to all RLC instances in the CU to preemptively transmit Status Report(s) to the UE. Since the PHY/MAC instance in the CU does not know which RLC instances were represented in the lost TB, it will trigger Status Reports in all RLC instances of the UE. Upon receiving the Status Report(s), the RLC instance(s) in the UE will retransmit the lost data. In some implementations, the MAC instance in the CU, upon receiving a negative CRC report for an overridden PUSCH transmission, can send, using cross-layer communications, a trigger to the RLC instance(s) in the CU and request the transmission of Status Report(s) from the CU at the earliest opportunity.

The example implementations of the MAC-RLC interactions described herein can be modified by weaving the Status Report trigger into normal operation of the RLC in the CU. For example, when a MAC instance in the CU detects an unrecoverable HARQ error for an overridden TB, the MAC instance may send cross-layer indications to RLC instances in the CU to configure t-ordering timers to be in an expired state. This expired state will cause all RLC instances of the UE in the CU to send a Status Report upon detecting a missing RLC PDU. Alternatively, the cross-layer indication from the MAC layer can be used in the CU to set a Status Report polling bit on a next RLC PDU(s) received from the UE equal to 1 before an RLC PDU header is processed.

Uplink Subframe Bundling

The example features described below may be implemented in, but are not limited to use in, a radio network, such as those shown in FIGS. 1 and 2.

On the uplink, in a case where a UE is extremely power-limited and may not have enough power to transmit even on a very small number of RBs in each TTI (e.g., one or two RBs), the RBs can be scheduled on multiple consecutive TTIs to meet the data demand. UEs such as this can be starved by any HARQ suspension at the scheduler caused by delayed arrival of PUSCH transmissions at the RU/CU. The CU can therefore configure such UEs to operate in a subframe bundling mode, in which the UE can be allocated resources on multiple consecutive TTIs to send a single TB. In an example implementation of subframe bundling, four redundancy versions of a single transport block can be scheduled at the same time or at about the same time. This can be viewed as a pre-emptive retransmission process, in which the UE transmits four redundancy versions (RVs) without waiting for HARQ feedback. The RV specifies which combination of data is being sent to the UE. In some implementations of subframe bundling, the UE may be allocated at most three RBs per TTI and the modulation order may be limited to QPSK (quadrature phase shift keying). At the highest MCS for QPSK (I_TBS=10), subframe bundling can support a peak rate of 500 bits every four TTIs, or roughly 125 kbps. Subframe bundling allows the UE to transmit at a higher rate (MCS) than otherwise would be possible, and may be useful for VoIP (voice over Internet Protocol) users at or near the edge of a cell. A single HARQ feedback is used for the bundle, which may reduce PHICH and DCI Type-0 overhead. HARQ retransmission delay may be reduced or avoided when the bundle is correctly received.

In some implementations of subframe bundling, the UE may be able to send an entire VoLTE (voice over LTE) packet in four TTIs, and not suffer any blocking due to HARQ suspension. In some implementations of subframe bundling, the CU sends an ACK/NAK 4 ms after the last subframe of the bundle is received from the UE. The CU may be able to decode the bundle before receiving all four subframes, but the UE may still transmit the remaining subframes. In some implementations of subframe bundling, there can be at most four HARQ processes, each occupying four subframes, and the HARQ loop is 16 ms (e.g., retransmission can occur at the earliest 16 ms after the first transmission). This means that, in some implementations, the grant for a retransmission can occur 5 ms after a forcible ACK. For example, when a first subframe bundle transmission occurs on TTIs k through k+3, the forcible ACK is sent in TTI k+7; a retransmission allocation can be sent in TTI k+12; and the retransmission of the bundle can start in TTI k+16. Thus, in this example, the fronthaul latency can be increased by 5 ms without impacting HARQ retransmissions. Subframe bundling can therefore tolerate more latency. If the fronthaul latency is increased further, for example by 8 ms, the retransmission will be delayed until TTI k+32. However, in some implementations, subframe bundling already has built-in retransmissions, and it may be acceptable to disable further retransmissions, provided, e.g., that the MCS is chosen more conservatively for higher reliability. This occurs automatically when UE is allocated RBs for a new transmission in TTI k+16.

Thus, under certain circumstances, the processes described herein may increase fronthaul latency (e.g., by up to 5 ms to 10 ms) and may operate HARQ with delayed retransmissions. In some implementations, for power-limited UEs, subframe bundling may be usable to improve coverage, and HARQ may be operated without any further delays in retransmissions. In some implementations, to prevent the delayed retransmissions from decreasing the percentage of TTIs available for UL transmission, the scheduler in the CU can override a pending TB transmission and initiate a new TB transmission on the same HARQ process. Upon CRC failure for the previous TB, the scheduler can trigger an RLC Status Report to speed up the RLC retransmission by the UE. In some implementations, the processes can tolerate an increase in fronthaul latency (e.g., 8 ms or more), as described herein.

Extension to TD-LTE

The example processes described herein can be implemented in both time division LTE (TD-LTE) systems and frequency division LTE (FD-LTE) system. In TD-LTE, HARQ timing can be different from that in FD-LTE, and may depend on the frame configuration in use. Table 1 below shows normal HARQ timing for different frame configurations of TD-LTE. Also shown in Table 1 are the number of HARQ processes x and y for the DL and UL, indicated as [DL: x, UL: y]. In Table 1, "D" stands for "Downlink", "U" stands for "Uplink", and "S" stands for "Special Subframe".

TABLE 1

| Subframe # | 0 | 1 | 2 | 3 | 4 | 5 | 6 | 7 | 8 | 9 |
|---|---|---|---|---|---|---|---|---|---|---|
| 0 [DL: 4, UL: 6] | D | S | U | U | U | D | S | U | U | U |
| ACK/NAK (in ms) | 4 | 6 | 4 | 7 | 6 | 4 | 6 | 4 | 7 | 6 |
| Re-Transmission (in ms) | 6 | 4 | 6 | 4 | 4 | 6 | 4 | 6 | 4 | 4 |
| Total Time (in ms) | 10 | 10 | 10 | 11 | 10 | 10 | 10 | 10 | 11 | 10 |
| 1 [DL: 7, UL: 4] | D | S | U | U | D | D | S | U | U | D |
| ACK/NAK (in ms) | 7 | 6 | 4 | 6 | 4 | 7 | 6 | 4 | 6 | 4 |
| Re-Transmission (in ms) | 4 | 4 | 6 | 4 | 6 | 4 | 4 | 6 | 4 | 6 |
| Total Time (in ms) | 11 | 10 | 10 | 10 | 10 | 11 | 10 | 10 | 10 | 10 |
| 2 [DL: 10, UL: 2] | D | S | U | D | D | D | S | U | D | D |
| ACK/NAK (in ms) | 7 | 6 | 6 | 4 | 8 | 7 | 6 | 6 | 4 | 8 |
| Re-Transmission (in ms) | 4 | 4 | 4 | 4 | 4 | 4 | 4 | 4 | 4 | 4 |
| Total Time (in ms) | 11 | 10 | 10 | 8 | 12 | 11 | 10 | 10 | 8 | 12 |
| 3 [DL: 9, UL: 3] | D | S | U | U | U | D | D | D | D | D |
| ACK/NAK (in ms) | 4 | 11 | 6 | 6 | 6 | 7 | 6 | 6 | 5 | 5 |
| Re-Transmission (in ms) | 4 | 4 | 4 | 4 | 4 | 4 | 4 | 4 | 4 | 4 |
| Total Time (in ms) | 8 | 15 | 10 | 10 | 10 | 11 | 10 | 10 | 9 | 9 |
| 4 [DL: 12, UL: 2] | D | S | U | U | D | D | D | D | D | D |
| ACK/NAK (in ms) | 12 | 11 | 6 | 6 | 8 | 7 | 7 | 6 | 5 | 4 |
| Re-Transmission (in ms) | 4 | 4 | 4 | 4 | 4 | 4 | 4 | 4 | 4 | 4 |
| Total Time (in ms) | 16 | 15 | 10 | 10 | 12 | 11 | 11 | 10 | 9 | 8 |
| 5 [DL: 15, UL: 1] | D | S | U | D | D | D | D | D | D | D |
| ACK/NAK (in ms) | 12 | 11 | 6 | 9 | 8 | 7 | 6 | 5 | 4 | 13 |
| Re-Transmission (in ms) | 4 | 4 | 4 | 4 | 4 | 4 | 4 | 4 | 4 | 4 |
| Total Time (in ms) | 16 | 15 | 10 | 13 | 12 | 11 | 10 | 9 | 8 | 17 |

TABLE 1-continued

| Subframe # | 0 | 1 | 2 | 3 | 4 | 5 | 6 | 7 | 8 | 9 |
|---|---|---|---|---|---|---|---|---|---|---|
| 6 [DL: 6, UL: 6] | D | S | U | U | U | D | S | U | U | D |
| ACK/NAK (in ms) | 7 | 7 | 4 | 6 | 6 | 7 | 7 | 4 | 7 | 5 |
| Re-Transmission (in ms) | 8 | 7 | 6 | 4 | 4 | 7 | 6 | 6 | 7 | 5 |
| Total Time (in ms) | 15 | 14 | 10 | 10 | 10 | 14 | 13 | 10 | 14 | 10 |

According to the TD-LTE configurations 2-5 of Table 1, a CU/RU has only 4 ms for a DL retransmission, which is the same as in frequency division duplexing (FDD) in FD-LTE systems. The scheduler in a CU can delay retransmission until some other DL subframe. In normal HARQ, this will result in a suspension, when all DL HARQ processes are pending. Generally, the impact of such suspension is lower in TD-LTE than in FD-LTE, because the number of available DL HARQ processes in TD-LTE is higher than in FD-LTE. As in FD-LTE, in TD-LTE a pending PDSCH transmission can be overridden, and HARQ effectively disabled. Data recovery can be triggered using the RLC or MAC layer retransmission methods described herein.

In the TD-LTE configurations 2-5 of Table 1, the CU/RU has 6 ms to send ACK/NAK and DCI Type-0 in response to a PUSCH transmission. This is 2 ms longer than in FD-LTE. If the delays are increased further, in normal HARQ operation, suspension will occur. Since in these common configurations, there are only 1-3 HARQ processes available and the UE may have a bandwidth constraint, suspension of UL transmissions can be problematic. For example, in the extreme example of configuration 5, when a UE is scheduled on subframe 2, the UE should receive a resource allocation in subframe 8 for a retransmission in subframe 12. If the CU/RU is not able to process the PUSCH transmission in time to send the allocation in subframe 8, in normal HARQ, the UE cannot be scheduled again for new data in subframe 12. This will effectively reduce the number of available subframes for UL transmission by 50% from an already low value, but increase the available time at the CU by 10 ms, from 6 ms to 16 ms.

In an example, in subframe 8 the UE can be assigned resources for a new transmission, resulting in HARQ being disabled for the pending TB. The CU can then initiate a data recovery by triggering a Status Report on the DL as described herein.

Random Access (RA) Response

The example features described below may be implemented in, but are not limited to use in, a radio network, such as those shown in FIGS. 1 and 2.

In addition to HARQ, increased fronthaul latency may also impact the timely transmission of the random access (RA) response message by the CU in response to the receipt of a random access preamble. In LTE, once a random access peamble is received from the UE, the eNB needs to transmit a RA response no more than 3+ra-ResponseWindowSize subframes later, where ra-ResponseWindowSize is a cell-specific parameter that can, at most, equal 10 ms in some implementations. In other words, in some implementations, RA response needs to be transmitted over the air no more than 13 subframes after receiving the RA-preamble. Assuming that the RA-response is nominally (zero latency) scheduled in the controller at least 2 ms prior to OTA (over-the-air) and the PRACH detection is available at least 1 ms earlier, the RA response message can be transmitted within the allowed window, as long as the round-trip fronthaul latency is less than 13−2−1=10 ms. In other words, in this example, RA response generation in the CU can tolerate up to 10 ms of round-trip fronthaul latency. Implementations Although various assumptions are made for the purpose of explanation, the example implementations of the systems and methods described in this disclosure are not limited by these assumptions. Instead, the explanation based on these assumptions can be readily generalized to other situations. For example, the numbers of RUs in each cell, the numbers of antennas for each RU, and the numbers of cells in a network can vary, e.g., based on the network demands.

All or part of the features described herein may, as appropriate, be implemented using a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

All or part of the processes described herein and their various modifications (hereinafter referred to as "the processes") can be implemented, at least in part, via a computer program product, e.g., a computer program tangibly embodied in one or more information carriers, e.g., in one or more tangible, non-transitory machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the processes, computer programs, etc. described herein without adversely affecting their operation. Furthermore, various separate elements may be combined into one or more individual elements to perform the functions described herein.

Any of the features described herein may be combined, as appropriate, with any of the features described in: (i) U.S. Provisional Application No. 62/009,653 (filed Jun. 9, 2014), which is incorporated herein by reference, (ii) U.S. Provisional Application No. 62/051,212 (filed Sep. 16, 2014), which is incorporated herein by reference, (iii) U.S. patent application Ser. No. 14/734,311 (filed Jun. 9, 2015), which is incorporated herein by reference, (iv) U.S. patent application Ser. No. 13/762,283 (filed Feb. 7, 2013), which is incorporated herein by reference, (v) U.S. patent application Ser. No. 13/762,284 (filed Feb. 7, 2013), which is incorporated herein by reference, and (vi) U.S. patent application Ser. No. 13/762,292 (filed Feb. 7, 2013), which is incorporated herein by reference.

What is claimed is:

1. A communication system comprising:
    remote units, each of the remote units comprising one or more radio frequency (RF) units to exchange RF signals with mobile devices, at least some of the RF signals comprising information destined for, or originating from, a mobile device; and
    a controller separated from the remote units by one or more networks, the controller being connected to an external network, the controller for implementing a scheduler, the scheduler for allocating resources for transmission of data representing the information, and the scheduler being configured to override a pending hybrid automatic repeat request (HARQ) transmission sent by the mobile device on a HARQ process by scheduling a new HARQ transmission on the HARQ process;
    wherein the controller is configured to accelerate retransmission of data in the overridden HARQ transmission sent by the mobile device by performing operations comprising:
        detecting, at a media access control instance of the controller, an unrecoverable error for the overridden HARQ transmission sent by the mobile device;
        sending a cross-layer indication to a radio link control instance in the controller to place a timer in an expired state, resulting in transmission of a status message to the mobile device, the status message indicating an error in the data; and
        receiving, from the mobile device, a retransmission of the data in response to the status message.

2. The communication system of claim 1, wherein the mobile device is configured to operate in a subframe bundling mode.

3. A communication system comprising:
    remote units, each of the remote units comprising one or more radio frequency (RF) units to exchange RF signals with mobile devices, at least some of the RF signals comprising information destined for, or originating from, a mobile device; and
    a controller separated from the remote units by one or more networks, the controller being connected to an external network, the controller for implementing a scheduler, the scheduler for allocating resources for transmission of data representing the information by the mobile device, and the controller being configured to cause the mobile device to accelerate retransmission of the data by performing operations comprising:
        detecting, at a media access control instance of the controller, an unrecoverable error for the transmission of the data by the mobile device;
        sending a cross-layer indication to a radio link control instance in the controller to place a timer in an expired state, resulting in transmission of a status message to the mobile device, the status message indicating an error in the data; and
        receiving, from the mobile device, a retransmission of the data in response to the status message.

4. The communication system of claim 3, wherein the mobile device is configured to operate in a subframe bundling mode.

5. A method for use with a communication system that includes remote units, each of the remote units comprising one or more radio frequency (RF) units to exchange RF signals with mobile devices, at least some of the RF signals comprising information destined for, or originating from, a mobile device; and a controller separated from the remote units by one or more networks, the controller being connected to an external network, the controller for implementing a scheduler, the scheduler for allocating resources for transmission of data representing the information by the mobile device, the method comprising:
    in order to accelerate retransmission of the data:
        detecting, at a media access control instance of the controller, an unrecoverable error for the transmission of the data by the mobile device;
        sending a cross-layer indication to a radio link control instance in the controller to place a timer in an expired state, resulting in transmission of a status message to the mobile device, the status message indicating an error in the data; and
        receiving, from the mobile device, a retransmission of the data in response to the status message.

6. The method of claim 5, wherein the mobile device is configured to operate in a subframe bundling mode.

* * * * *